US012383774B2

(12) United States Patent
Krespi et al.

(10) Patent No.: US 12,383,774 B2
(45) Date of Patent: Aug. 12, 2025

(54) NASAL DEVICE WITH AIR FILTER

(71) Applicant: Valam Corporation, Ridgefield, CT (US)

(72) Inventors: Yosef P. Krespi, Ridgefield, CT (US); Ron Hadani, Even-Yahuda (IL); Alexander K. Arrow, Lake Forest, CA (US)

( * ) Notice: Subject to any disclaimer, the term of this patent is extended or adjusted under 35 U.S.C. 154(b) by 236 days.

(21) Appl. No.: 17/870,761

(22) Filed: Jul. 21, 2022

(65) Prior Publication Data

US 2022/0362591 A1 Nov. 17, 2022

Related U.S. Application Data

(62) Division of application No. 15/367,806, filed on Dec. 2, 2016, now Pat. No. 11,426,614.

(60) Provisional application No. 62/262,699, filed on Dec. 3, 2015.

(51) Int. Cl.
*A62B 23/06* (2006.01)

(52) U.S. Cl.
CPC .................................... *A62B 23/06* (2013.01)

(58) Field of Classification Search
CPC ........... A62B 23/06; A62B 23/00; A62B 9/00; A62B 9/006; A62B 9/02; A62B 9/06; A61M 15/08; A61M 15/085; A61M 15/00
See application file for complete search history.

(56) References Cited

U.S. PATENT DOCUMENTS

| | | | | |
|---|---|---|---|---|
| 4,087,332 | A * | 5/1978 | Hansen | C12Q 1/18 435/805 |
| 5,323,774 | A * | 6/1994 | Fehlauer | A62B 18/088 128/205.23 |
| 6,701,924 | B1 * | 3/2004 | Land, Jr. | A62B 23/06 128/207.18 |
| 8,651,106 | B1 * | 2/2014 | Morgan, Jr. | A62B 23/06 128/205.27 |
| 2003/0106555 | A1 * | 6/2003 | Tovey | A61F 5/08 128/205.27 |
| 2008/0023007 | A1 * | 1/2008 | Dolezal | A62B 23/06 128/206.11 |
| 2012/0060842 | A1 * | 3/2012 | Curtis | A62B 23/06 128/206.11 |
| 2013/0136801 | A1 * | 5/2013 | Tennican | A61M 39/162 435/31 |
| 2017/0106217 | A1 * | 4/2017 | Kuhn | A41D 13/1115 |
| 2018/0104518 | A1 * | 4/2018 | Lee | A62B 23/06 |

* cited by examiner

*Primary Examiner* — Jason E Flick
(74) *Attorney, Agent, or Firm* — Joseph P. Aiena

(57) ABSTRACT

A nasal device for filtering air breathed into a user's nose is disclosed herein. In an embodiment, a nasal device includes a body sized and shaped to be secured to at least one of a user's nostrils, and a filter positioned on the body so as to be located over at least one of the user's nasal passages when the body is secured to the user's at least one nostril, wherein the filter filters air breathed into the user's at least one nasal passage when the body is secured to the user's at least one nostril.

14 Claims, 20 Drawing Sheets

NASAL DEVICE WITH AIR FILTER

CROSS REFERENCE TO RELATED APPLICATIONS

This application is a divisional application, claiming benefit of and priority to U.S. Non-Provisional application Ser. No. 15/367,806 filed on Dec. 2, 2016, which claims benefit of and priority to U.S. Provisional patent application Ser. No. 62/262,699 filed on Dec. 3, 2015, each of which are incorporated by reference herein in their entirety.

FIELD OF THE INVENTION

The present disclosure relates generally to a filter that is placed over or into a user's nose to filter air breathed in by the user, and more specifically to a nasal device including the filter that can be attached to the user's nose.

BACKGROUND

Respiratory face masks are worn for a variety of professions. Industrial workers wear respirator masks to filter dust, small particles, pollutants, chemical agents and dangerous gases from the air. Medical workers wear respirator masks as protection against the contraction of infectious diseases.

SUMMARY

The present disclosure is directed to methods and apparatuses that filter air breathed into a user's nose. In a general example embodiment, a nasal device includes a body sized and shaped to be secured to at least one of a user's nostrils, and a filter positioned on the body so as to be located over at least one of the user's nasal passages when the body is secured to the user's at least one nostril, wherein the filter filters air breathed into the user's at least one nasal passage when the body is secured to the user's at least one nostril.

In another example embodiment, the nasal device includes an adhesive to secure the body to the user's at least one nostril.

In another example embodiment, the body pinches the user's septal cartilage to secure the body to the user's at least one nostril.

In another example embodiment, the body is sized and shaped to be secured to both of the user's nostrils.

In another example embodiment, the body includes a narrow portion with opposite bulbous portions on each side, the narrow portion configured to be located over the user's septal cartilage when the bulbous portions are secured to the user's nostrils.

In another example embodiment, the filter is located to cover both of the user's nasal passages when the body is secured to the user's nostrils.

In another example embodiment, the nasal device includes a valve that allows unfiltered air to be breathed out of the user's at least one nasal passage.

In another example embodiment, the filter includes copper or a copper alloy.

In another example embodiment, the body is secured to the user's at least one nostril by being placed within the at least one nasal cavity.

In another example embodiment, the body includes at least one of: (i) a nose tab configured to fold up over the tip of the user's nose when the body is secured to at least one of a user's nostrils; and (ii) a nostril tab configured to fold up over a side of the user's nostril when the body is secured to at least one of a user's nostrils.

In another example embodiment, the nasal device includes a contamination indicator configured to indicate when the filter has been contaminated.

In another example embodiment, the contamination indicator is configured to change color when the filter has been contaminated.

In another general example embodiment, a nasal device includes a body configured to adhere to skin on at least one of a user's nostrils around at least one of the user's nasal passages, and a filter positioned on the body to be located over the user's at least one nasal passage when the body is secured to the user's at least one nostril, wherein the filter filters air breathed into the user's at least one nasal passage when the body is secured to the user's at least one nostril.

In another example embodiment, the nasal device includes a valve that allows unfiltered air to be breathed out of the user's at least one nasal passage.

In another example embodiment, the nasal device includes an adhesive to adhere the body to the user's at least one nostril.

In another example embodiment, the body is configured to adhere to skin on both of the user's nostrils.

In another example embodiment, the body includes a narrow portion with opposite bulbous portions on each side, the narrow portion configured to be located over the user's septal cartilage when the bulbous portions are adhered to skin on the user's nostrils.

In another example embodiment, the filter is located to cover both of the user's nasal passages when the body is adhered to skin on the user's nostrils.

In another example embodiment, the body includes at least one of: (i) a nose tab configured to fold up over the tip of the user's nose when the body is secured to at least one of a user's nostrils; and (ii) a nostril tab configured to fold up over a side of the user's nostril when the body is secured to at least one of a user's nostrils.

In another general example embodiment, a nasal device includes a body configured to pinch a user's septal cartilage, a first filter positioned on the body so as to be located within one of the user's nasal passages when the body pinches the user's septal cartilage, and a second filter positioned on the body so as to be located within the other of the user's nasal passages when the body pinches the user's septal cartilage, wherein the first and second filters filter air breathed into the user's nasal passages when the body pinches the user's septal cartilage.

In another example embodiment, the nasal device includes a valve that allows unfiltered air to be breathed out of the user's at least one nasal passage In another example embodiment, the first filter overlaps the second filter before the body pinches the user's septal cartilage.

In another example embodiment, the body includes a bridge with opposite bulbous portions on each side, the bulbous portions configured to pinch the user's septal cartilage.

In another example embodiment, the first and second filters each include a top portion, a bottom portion, and a middle portion spiraling around the body from the top portion to the bottom portion In another example embodiment, the nasal device includes a contamination indicator configured to indicate when the filter has been contaminated.

In another example embodiment, the contamination indicator is configured to change color when the filter has been contaminated.

In another general example embodiment, a nasal device includes an upper body sized and shaped to be secured to at least one of the user's nostrils, the upper body including a filter configured to filter air breathed into the user's at least one nostril when the body is secured to the user's at least one nostril, and a lower body attached to the upper body, the lower body configured to be placed in the user's mouth while the upper body is secured to the user's at least one nostril.

In another general example embodiment, a kit for filtering a user's breathing includes a first nasal device sized and shaped to be placed into one of the user's nasal passages, the first nasal device including a first filter to filter air breathed into the one of the user's nasal passages, and a second nasal device sized and shaped to be placed into one of the user's nasal passages, the second nasal device including a second filter to filter air breathed into the other of the user's nasal passages, wherein the first nasal device and the second nasal device differ in at least one of (i) a size of the first and second nasal devices; (ii) a shape of the first and second nasal devices; (iii) a material of the first and second nasal devices; (iv) a size of the first and second filters; (v) a shape of the first and second filters; and (vi) a material of the first and second filters.

In another example embodiment, the first and second nasal devices differ in height.

In another example embodiment, the first and second nasal devices differ in diameter.

In another example embodiment, the first and second nasal devices differ in shape.

In another example embodiment, a body of the first nasal device is formed from a different material than a body of the second nasal device.

In another example embodiment, the first and second filters differ in size.

In another example embodiment, the first and second filters differ in shape.

In another example embodiment, the first and second filters differ in at least one material.

BRIEF DESCRIPTION OF THE FIGURES

Embodiments of the present disclosure will now be explained in further detail by way of example only with reference to the accompanying figures, in which.

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

Figure 1:
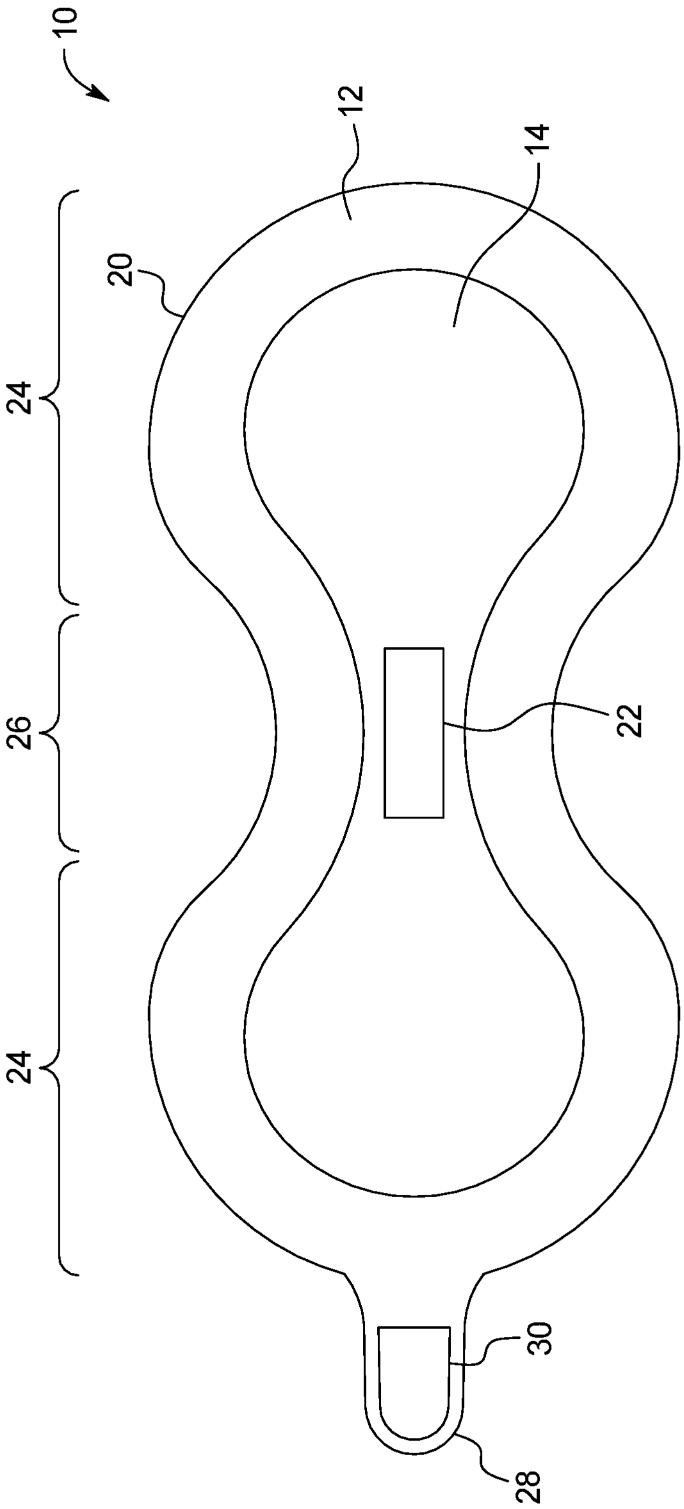
FIG. 1 shows a front elevational view of an example embodiment of a nasal device according to the present disclosure.
Figure 3:
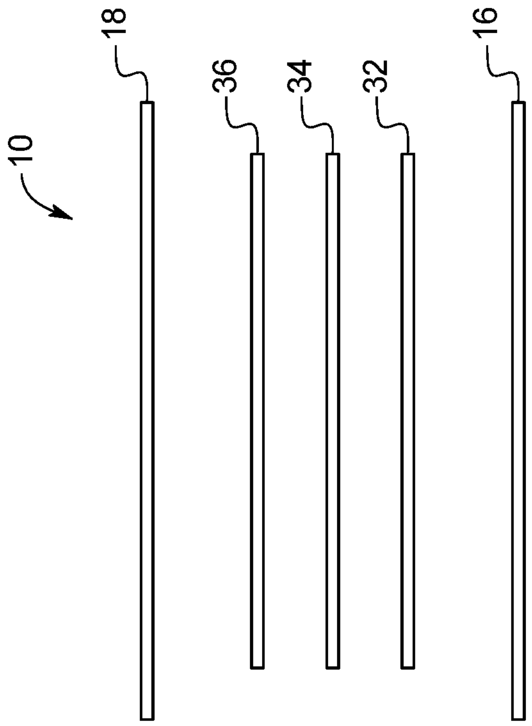
FIG. 3 shows an exploded view of the nasal device of FIG. 1.
Figure 2:
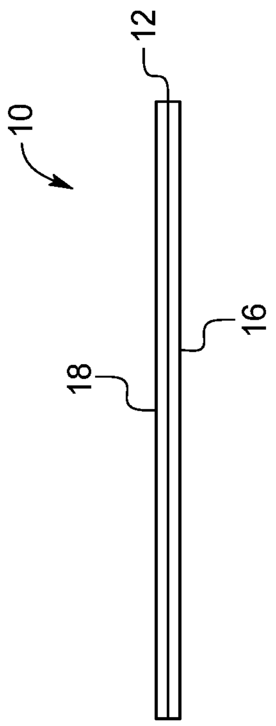
FIG. 2 shows a side elevational view of the nasal device of FIG. 1.

FIGS. 1 to 3 illustrate an example embodiment of a nasal device 10 according to the present disclosure. In the illustrated embodiment, nasal device 10 includes a body 12 that can be secured over a user's nasal passages and a filter 14 that filters air breathed into the user's nose.

Body 12 is a thin, flexible, preferably elastic material that can be bent or adjusted to fit a variety of differently shaped nostrils. As explained in more detail below, air breathed in by a user of nasal device 10 should only pass through filter 14, so body 12 must be formed of an airtight material. Suitable materials include, for example, paper, plastic such as PVC, polyethylene or polyurethane, woven or nonwoven fabrics, or latex. Those of ordinary skill in the art will recognize other suitable materials that can be used for body 12.

In the illustrated embodiment, body 12 includes an adhesive surface 16 and an outer surface 18. The adhesive surface 16 is configured adhere to the skin on the user's nostrils around the user's nasal passages to align filter 14 over the user's nasal passages. The outer surface 18 is configured to face outward from the user's skin when nasal device 10 is being used. The adhesive surface 16 can either be an adhesive applied to the outer surface 18, or a layer of material separate from the outer surface 18 that contains adhesive and is attached to the outer surface 18. In a preferred embodiment, the adhesive surface 16 is a soft foam surface with adhesive applied to the soft foam. Suitable materials for the adhesive include, for example, acrylate or vinyl resins such as methacrylates or epoxy diacrylates. Those of ordinary skill in the art will recognize other suitable materials that can be used for adhesive surface 16.

In the embodiment illustrated in FIG. 1, body 12 has an outer contour 20 in the shape of a figure-eight, with two opposite bulbous portions 24 separated by a thinner central portion 26. The purpose of the outer contour 20 of body 12 is to closely match the contour of a user's nostrils on the bottom of the user's nose, with central portion 26 positioned over the user's septal cartilage when placed on the user's nose. Since air breathed in by the user should only pass through filter 14, the outer contour 20 of body 12 should be sized and shaped to press against the skin on the user's nostrils around the user's nasal passages, so that air cannot be breathed in through the user's nostrils without the air passing through filter 14. Those of ordinary skill in the art will understand that other sizes and shapes can also be used for body 12.

Filter 14 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 14 can include copper or a copper alloy. It has been determined that copper and copper alloys are effective in inactivating certain viruses, for example, human coronavirus. In a preferred embodiment, filter 14 therefore includes at least one layer of a copper mesh material. In an embodiment, filter 14 can include at least one layer of copper oxide-impregnated polypropylene fibers. Filter 14 can also include at least one layer of a woven or non-woven material that itself acts as a filter or is treated to filter dust, small particles, pollutants, chemical agents, dangerous gases and/or microorganisms from the air breathed by the wearer.

In an embodiment, filter 14 can be treated with an antimicrobial material. Those of ordinary skill in the art will recognize other materials that can be used for filter 14 besides those described herein. In alternative embodiments, filter 14 can include or exclude one or more of a ferrous metal, a non-ferrous metal, a noble metal, a heavy metal and a metal alloy. For example, filter 14 can include metals such as aluminum, iron, nickel, cobalt, silver and/or the like.

In an embodiment, filter 14 can include a textile or another material and be treated with particles or a chemical such as a liquid microbial. For example, filter 14 can include one ore more layer of spunbond polypropylene with impregnated copper oxide particles or meltblown polypropylene with impregnated copper oxide particles. Particles from other metals such as aluminum, iron, nickel, cobalt, silver and/or the like can also be used. The particles can be, for example, microparticles or nanoparticles. In alternative embodiments, the particles can be embedded in a textile or other material via a chemical treatment process, a sonochemical process or an acoustic cavitation process. For example, the particles can be embedded in a textile or other material via ultrasound.

In an embodiment, filter 14 can include one or more layers 32, 34, 36. FIG. 3 shows an example embodiment of filter 14 being formed with three layers between adhesive surface 16 and outer surface 18. As illustrated, first layer 32, second layer 34 and third layer 36 can be surrounded by adhesive layer 16 and outer layer 18 to form the configuration shown in FIG. 2. Those of ordinary skill in the art will recognize other suitable shapes, sizes and materials that can be used to design a nasal device 10 according to the present disclosure.

In different embodiments, each of one or more layers 32, 34, 36 can be a fabric layer such as a woven or nonwoven fabric or can be a hardened liquid material. In an embodiment, one layer 32, 34, 36 can for example include copper or a copper allow, while another layer 32, 34, 36 can be for example a woven or nonwoven material treated with a microbial or another composition. In another embodiment, one layer 32, 34, 36 can for example be made of a woven or nonwoven material, while another layer 32, 34, 36 can be a hardened liquid layer of a microbial or another treatment composition. In another embodiment, the middle layer 34 can for example be made of a woven or nonwoven material, while one or more outer layers 32, 36 can be hardened liquid layers of a microbial or another treatment composition. Those of ordinary skill in the art will recognize other ways to arrange multiple layers 32, 34, 36.

Body 12 can further include a tab 28 protruding from the outer contour 20. In the illustrated embodiment, tab 28 includes a contamination indicator/sensor 30. In an embodiment, contamination indicator 30 includes a specialized color-changing ink which changes color in the presence of known viruses and airborne bacteria. Upon contamination of nasal device 10, contamination indicator 30 changes color to indicate that the nasal device 10 needs to be replaced, changed, and/or properly disposed. Contamination indicator 30 can also change to different colors to indicate the level of microbial contamination or pollution. In an embodiment, contamination sensor 30 can be printed or stamped onto tab 28 or another external surface of nasal device 10. Tab 28 can also be used by a user to more easily remove nasal device 10 from the user's nose after use.

In an embodiment, the user of nasal device 10 can take a picture of his or her own face while wearing nasal device 10, and a computer-based application associated with the camera can perform a color analysis of the contamination indicator 30 to alert the user if nasal device 10 needs to be replaced. The camera application is advantageous, for example, because it allows the user to analyze nasal device 10/color indicator 30 without having to touch and potentially contaminate nasal device 10. In an embodiment, the application can indicate the level of contamination of nasal device 10 (e.g., 25%, 75%). In an embodiment, the application is a cellular phone application.

As illustrated in FIG. 1, nasal device 10 can also optionally include a microvalve 22 that permits unfiltered air to be breathed out by the user. In an embodiment, microvalve 22 is a one-way valve, wherein air can be exhaled through microvalve 22, but cannot be inhaled through microvalve 22. That is, air can flow through microvalve 22 in the direction from adhesive surface 16 towards outer surface 18, but not in the direction from outer surface 18 towards adhesive surface 16. Microvalve 22 is advantageous because it allows air to escape the user's nose more freely than if the air were to pass through filter 14, which provides a more normal breathing experience for the user when the purpose of filter 14 is only to filter air inhaled by the user.

Figure 5:
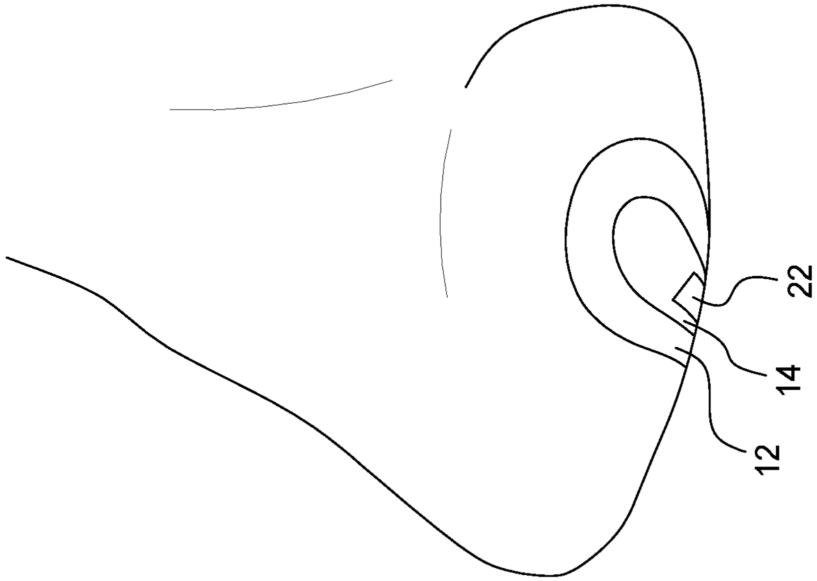
FIG. 5 shows a side perspective view of a user using the nasal device of FIG. 1 to filter air breathed in by the user.
Figure 4:
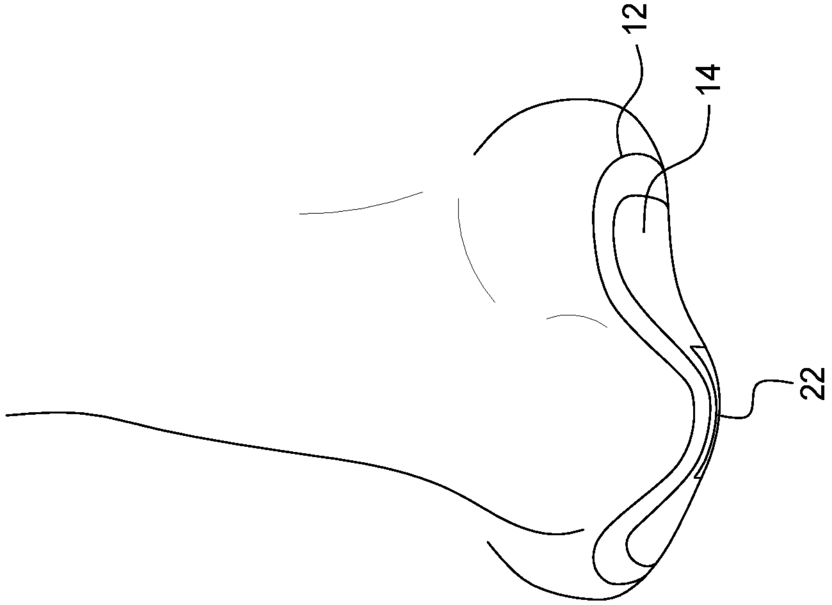
FIG. 4 shows a front perspective view of a user using the nasal device of FIG. 1 to filter air breathed in by the user.

FIGS. 4 and 5 shows nasal device 10 after it has been placed underneath a user's nose. As illustrated, nasal device 10 has been adhered to the bottom of the user's nose so that central portion 24 is positioned over the user's septal cartilage, and so that bulbous portions 22 adhere to the skin on the user's nostrils around the user's nasal passages. The positioning shown in FIGS. 4 and 5 positions filter 14 over the user's nasal passages so that the user can breathe through filter 14.

Figure 6:
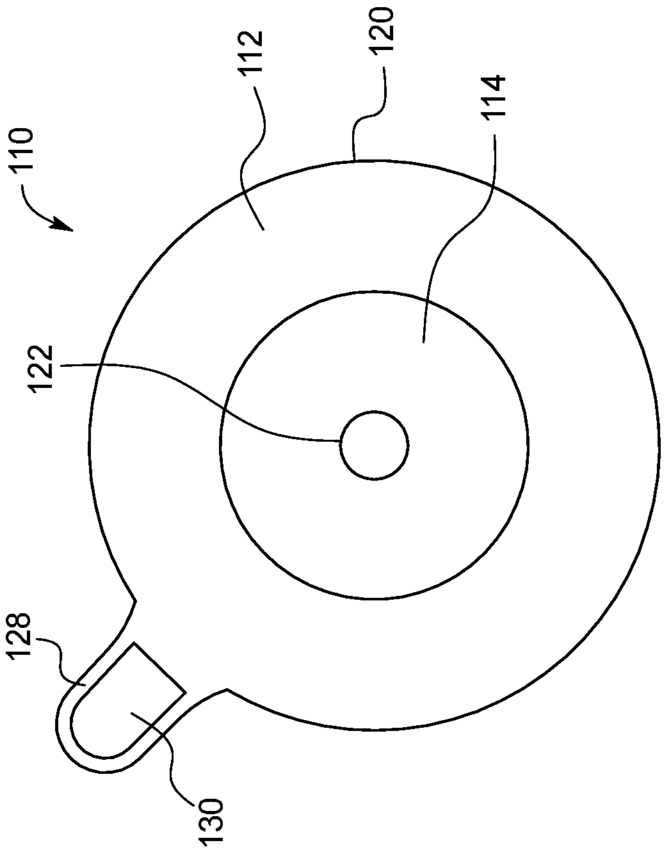
FIG. 6 shows a front elevational view of an example embodiment of a nasal device according to the present disclosure.
Figure 8:
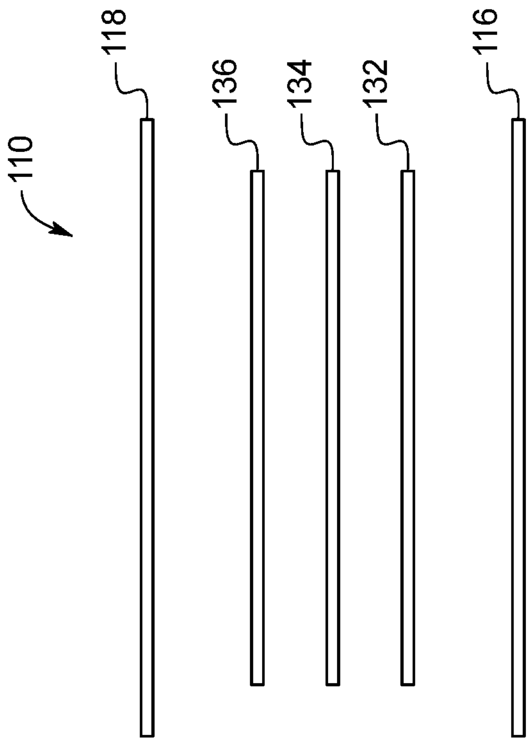
FIG. 8 shows an exploded view of the nasal device of FIG. 6.
Figure 7:
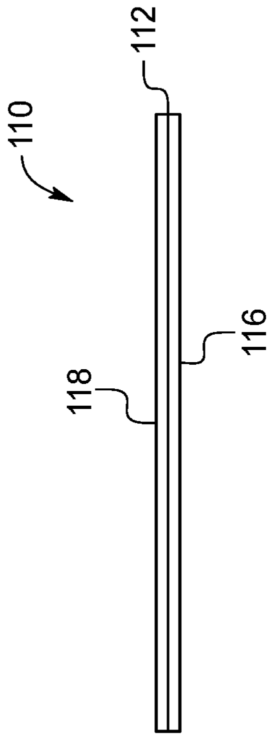
FIG. 7 shows a side elevational view of the nasal device of FIG. 6.

FIGS. 6 to 8 illustrate an alternative embodiment of a nasal device 110 according to the present disclosure. In the illustrated embodiment, nasal device 110 includes a body 112 that can be secured over a user's nasal passage and a filter 114 that filters air breathed into the user's nose. Nasal device 110 may also optionally include a microvalve 122 that permits unfiltered air to be breathed out by the user. In an embodiment, microvalve 122 is a one-way valve, wherein air can be exhaled through microvalve 122, but cannot be inhaled through microvalve 122.

Body 112 is a thin, flexible, preferably elastic material that can be bent or adjusted to fit a variety of differently shaped nostrils. Since air should only pass through filter 114 of nasal device 110 when the user is breathing in, body 112 must be formed of an airtight material. Suitable materials include, for example, paper, plastic such as PVC, polyethylene or polyurethane, woven or nonwoven fabrics, or latex. Those of ordinary skill in the art will recognize other suitable materials that can be used for body 112.

In the illustrated embodiment, body 112 includes an adhesive surface 116 and an outer surface 118. The adhesive surface 116 is configured adhere to the skin on the user's nostril around the user's nasal passage to align filter 114 over the user's nasal passage. The outer surface 118 is configured to face outward from the user's skin when nasal device 110 is being used. The adhesive surface 116 can either be an adhesive applied to the outer surface 116, or a layer of material separate from the outer surface 118 that contains adhesive and is attached to the outer surface 118. In a preferred embodiment, the adhesive surface 116 is a soft foam surface with adhesive applied to the soft foam. Suitable materials for the adhesive include, for example, acrylate or vinyl resins such as methacrylates or epoxy diacrylates. Those of ordinary skill in the art will recognize other suitable materials that can be used for adhesive surface 116.

In the embodiment illustrated in FIG. 6, the outer contour 120 of body 112 has a circular shape. The purpose of the circular shape is to closely match one of the user's nostrils, so that filter 114 can be positioned over one of the user's nasal cavities and completely cover the nasal cavity. In use, two of the nasal devices 110 are used by the user at the same time, with the user placing one nasal device 110 over each nostril such that the nasal devices 110 overlap at the user's septal cartilage. Those of ordinary skill in the art will understand that other sizes and shapes can be used for body 112.

Body 112 can further include a tab 128 protruding from the outer contour 20. In the illustrated embodiment, tab 128 includes a contamination indicator/sensor 130. In an embodiment, contamination indicator 130 includes a specialized color-changing ink which changes color in the presence of known viruses and airborne bacteria. Upon contamination of nasal device 110, contamination indicator 130 changes color to indicate that the nasal device 110 to be replaced, changed, and/or properly disposed. Contamination indicator 130 can also change to different colors to indicate the level of microbial contamination or pollution. In an embodiment, contamination sensor 130 can be printed or stamped onto tab 128 or another external surface of nasal device 110. Contamination indicator 130 can also be associated with a computer-based application as described above. Tab 128 can also be used by a user to more easily remove nasal device 110 from the user's nose after use.

Filter 114 can be formed as described above for filter 14. Like with nasal device 10, filter 114 of each nasal device 110 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 114 can include copper or a copper alloy or another material as described above. Those of ordinary skill in the art will recognize other materials that can be used. In alternative embodiments, filter 114 can include or exclude one or more of a ferrous metal, a non-ferrous metal, a noble metal, a heavy metal and a metal alloy. For example, filter 114 can include metals such as aluminum, iron, nickel, cobalt, silver and/or the like. Filter 114 can also be formed of one or more layers 132, 134, 136 as described above with respect to filter 14.

Figure 9:
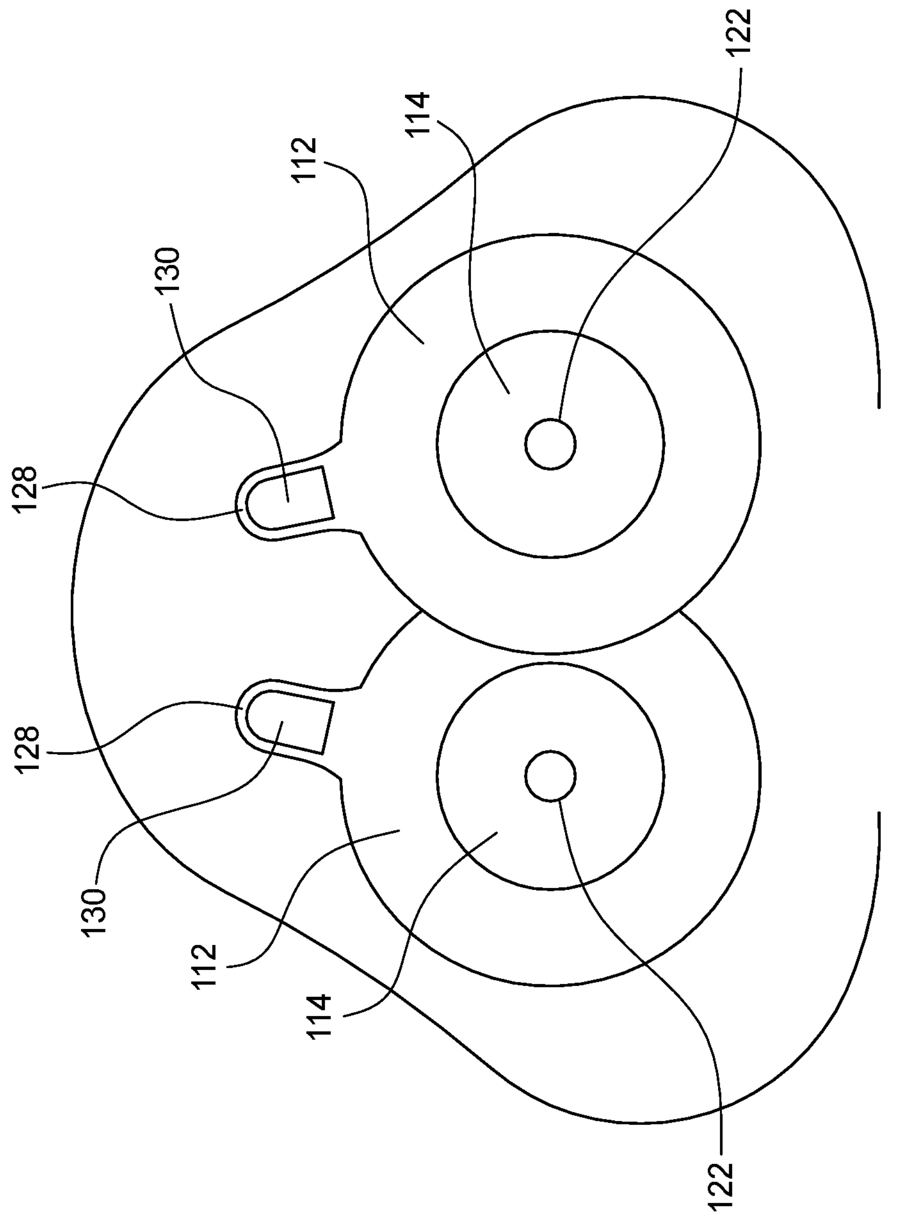
FIG. 9 shows a bottom view of a user using the nasal device of FIG. 6 to filter air breathed in by the user.

FIG. 9 shows two nasal devices positioned on a user's nose, such that the two nasal devices 110 overlap at the user's septal cartilage. As illustrated, each nasal device 110 covers one of the user's nasal passages by adhering to the skin of the user's nostril around the nasal passage. The use of two nasal devices 110, as compared to one nasal device 10 described above, can be advantageous because it allows users with irregularly shaped nostrils to position the two nasal devices 110 in a preferred manner. The user could also use different sized or shaped nasal devices 110 to cover different sized and shaped nostrils on the same nose. In an embodiment, a kit could be prepared for a user with a variety of nasal devices 110 of different shapes and sizes, and the user could determine which of the nasal devices 110 to use. The variety of different shapes and sizes can include, for example, different diameters for outer contour 120 and/or different shapes for outer contour 120. Different nasal devices 110 could also have different filter types (different shapes, sizes, materials, etc.) so that the user could use different types of filters in different settings.

Figure 10:
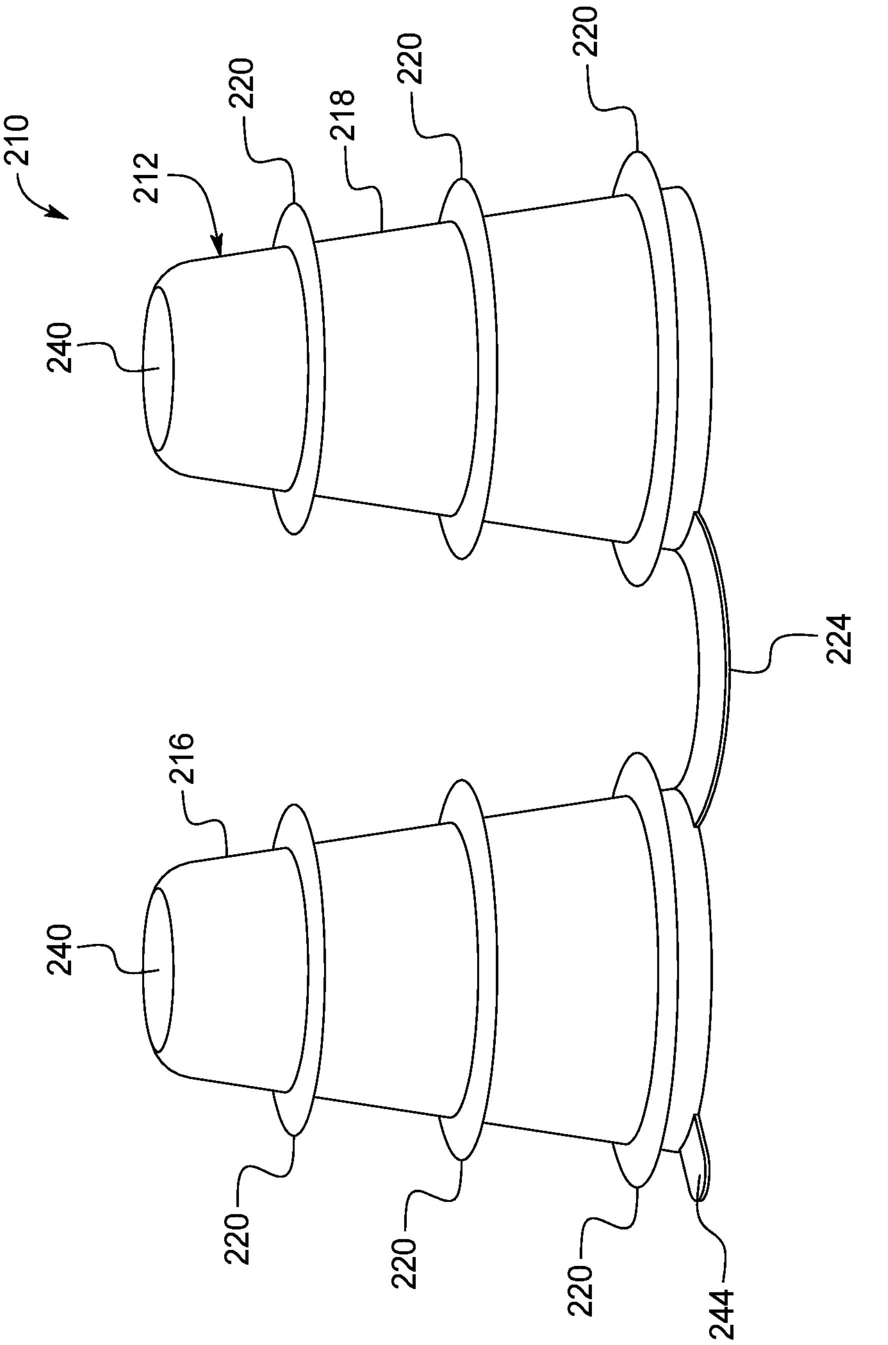
FIG. 10 shows a front perspective view of an example embodiment of a nasal device according to the present disclosure.
Figure 11:
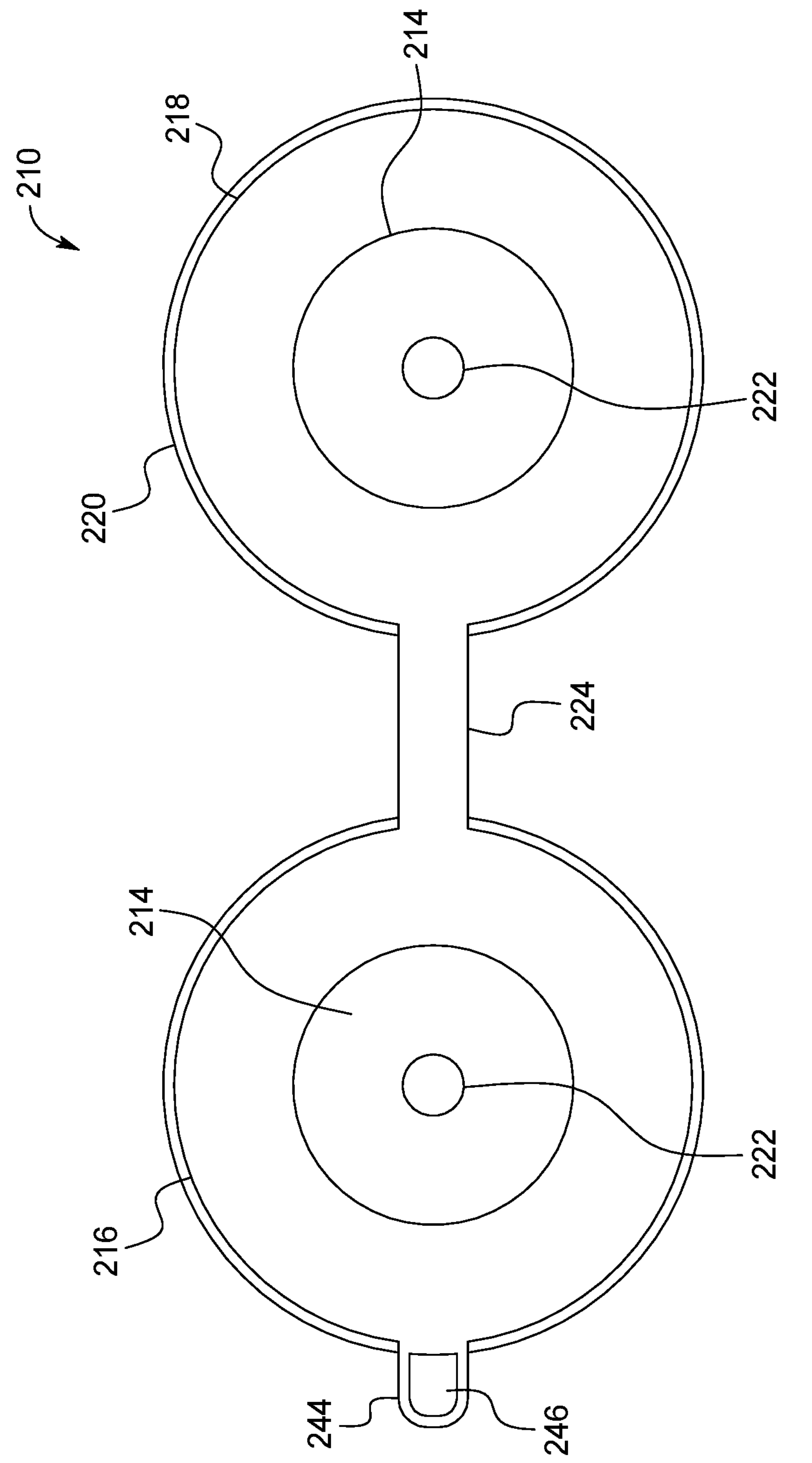
FIG. 11 shows a bottom plan view of the nasal device of FIG. 10.
Figure 12:
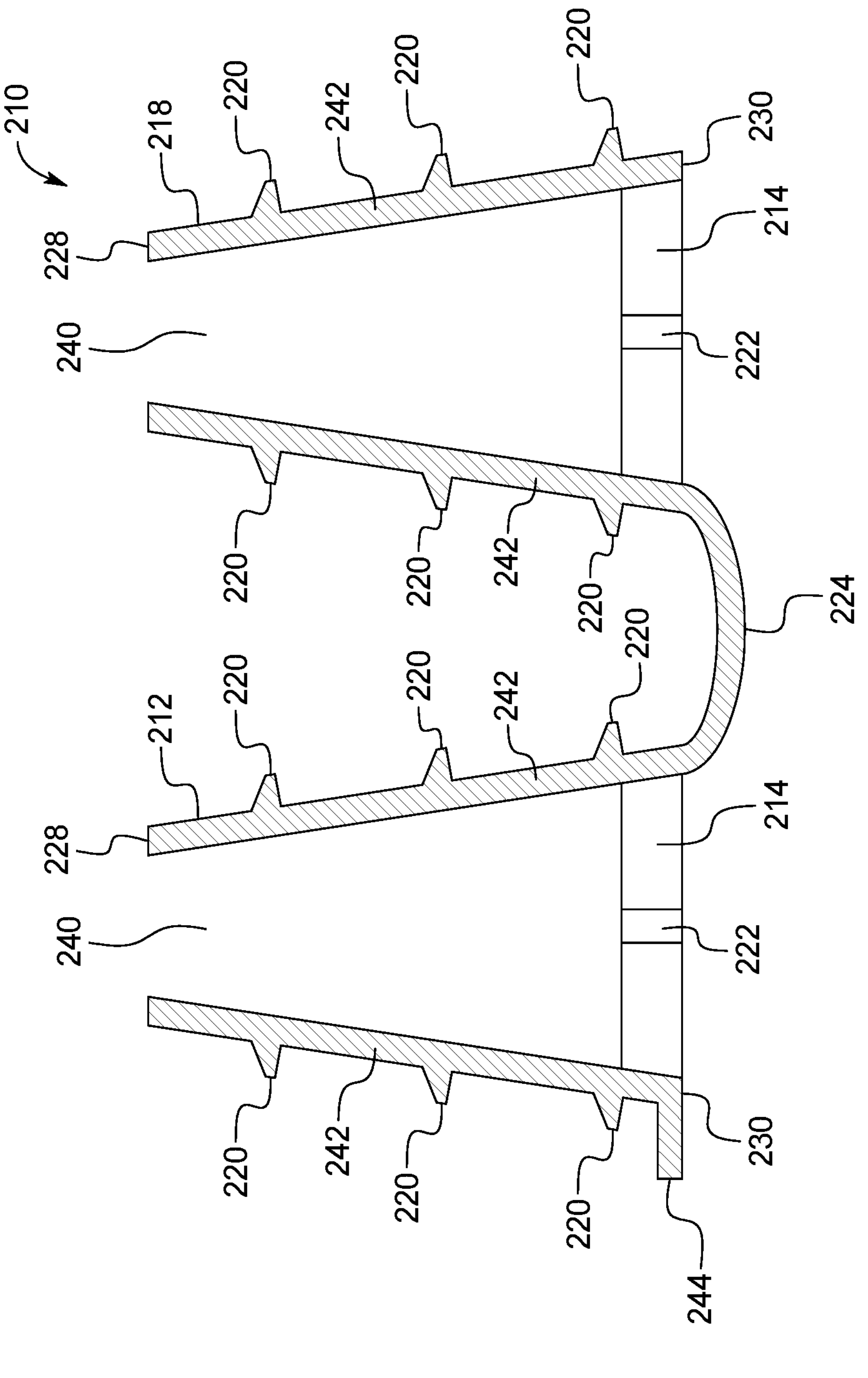
FIG. 12 shows a front cross-sectional view of the nasal device of FIG. 10.

FIGS. 10 to 12 illustrate an alternative embodiment of a nasal device 210 according to the present disclosure. In the illustrated embodiment, nasal device 210 includes a body 212 that can be placed into the user's nasal passages and a filter 214 that filters air breathed into the user's nose. When body 212 is placed into the user's nasal passages, body 212 provides an airtight seal of the user's nasal passages such that all air breathed in by the user must pass through filter 214

In the illustrated embodiment, body 212 includes a first nostril plug 216 and a second nostril plug 218, which are cone-shaped in FIG. 10. In use, the first nostril plug 216 is placed into the user's left nasal passage, and the second nostril plug 218 is placed into the user's right nasal passage, or vice versa. The first and second nostril plugs 216, 218 are connected by a bridge 224 that that is located over the user's septal cartilage when nasal device 210 is being used. Bridge 224 helps hold the first and second nostril plugs 216, 218 in place when placed in the user's nasal passages.

The first and second nostril plugs 216, 218 can be secured to the user's nostrils in a variety of ways to provide an airtight seal of the user's nasal passages such that all air breathed in by the user must pass through filter 214. In the illustrated embodiment, each of the first and second nostril plugs 216, 218 includes a plurality of flexible ribs 220 that conform to the inside of the user's nasal passages as the nostril plugs 216, 218 are inserted into the nasal passages, so as to anchor nasal device 210 within the user's nasal passages. In an embodiment, the ribs 220 can form a continuous spiral around a nostril plug 216, 218. In another embodiment, the first and second nostril plugs 216, 218 can be made of a flexible material such as a foam material that is capable of conforming to the inside of the user's nasal passages when inserted into the user's nostrils, and then returning to an original shape when removed from the user's nostrils. Suitable foam materials include, for example, plastic, urethane, polyurethane and other similar materials. Those of ordinary skill in the art will recognize other suitable materials that can be used.

Filter 214 can be formed as described above for filter 14. Like with nasal device 10, filter 214 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 214 can include copper or a copper alloy or another material as described above. Those of ordinary skill in the art will recognize other materials that can be used. In alternative embodiments, filter 214 can include or exclude one or more of a ferrous metal, a non-ferrous metal, a noble metal, a heavy metal and a metal alloy. For example, filter 214 can include metals such as aluminum, iron, nickel, cobalt, silver and/or the like. Filter 214 can also be formed of one or more layers as described above with respect to filter 14.

In the illustrated embodiment, filter 214 is located at the base 230 of each of first nostril plug 216 and second nostril plug 218 so that any air that passes through internal cavity 240 must pass through filter 214. Locating filter 214 at the base 230 of the first and second nostril plugs 216, 218 advantageously allows filter 214 to be a larger size than if it were located at an intermediate location or at the top of internal cavity 240, which allows more air to pass through filter 214. Those of ordinary skill in the art will recognize, however, that filter 214 can be located anywhere within internal cavity 240 and still serve its purpose to filter air breathed in by the user.

Nasal device 210 can also optionally include a microvalve 222 that permits unfiltered air to be breathed out by the user. In an embodiment, microvalve 222 is a one-way valve, wherein air can be exhaled through microvalve 222, but cannot be inhaled through microvalve 222. That is, air can flow through microvalve 222 in the direction from top surface 228 towards base 230, but not in the direction from base 230 towards top surface 228. In the illustrated embodiment, microvalve 222 is located in the center of filter 214, but microvalve 222 can also be located in other locations, for example, along a sidewall 242 of the first and second nostril plugs 216, 218.

In an embodiment, body 212 can further include a tab 244 including a contamination indicator/sensor 246. In an embodiment, contamination indicator 246 includes a specialized color-changing ink which changes color in the presence of known viruses and airborne bacteria. Upon contamination of nasal device 210, contamination indicator 246 changes color to indicate that the nasal device 210 needs to be replaced, changed, and/or properly disposed. Contamination indicator 246 can also change to different colors to indicate the level of microbial contamination or pollution. In an embodiment, contamination sensor 246 can be printed or stamped onto tab 244, or can be printed or stamped on another external surface of nasal device 210. Contamination indicator 230 can also be associated with a computer-based application as described above.

Figure 14:
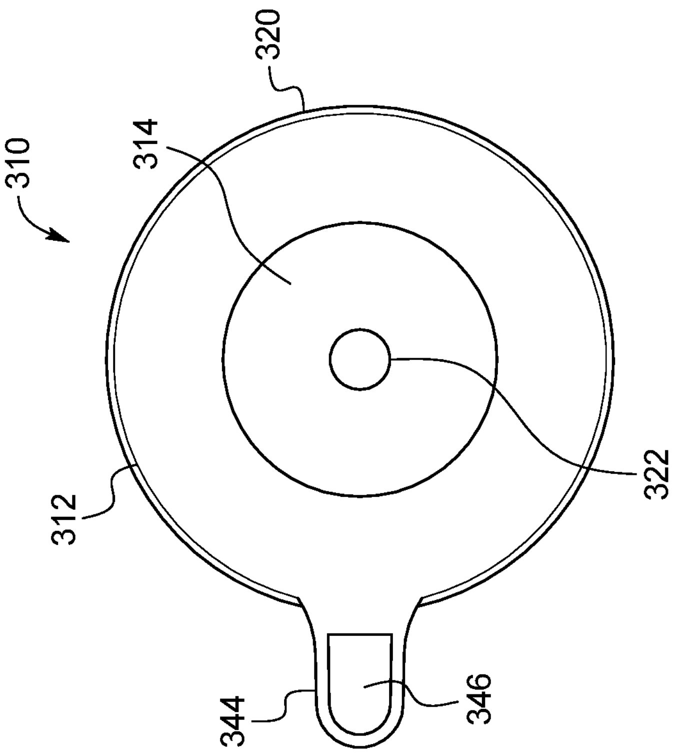
FIG. 14 shows a bottom plan view of the nasal device of FIG. 13.
Figure 13:
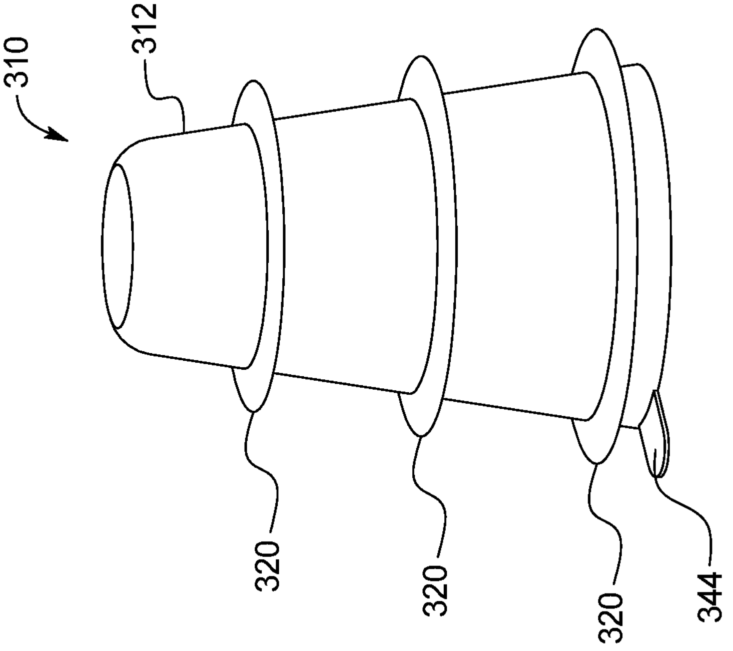
FIG. 13 shows a front perspective view of an example embodiment of a nasal device according to the present disclosure.
Figure 15:
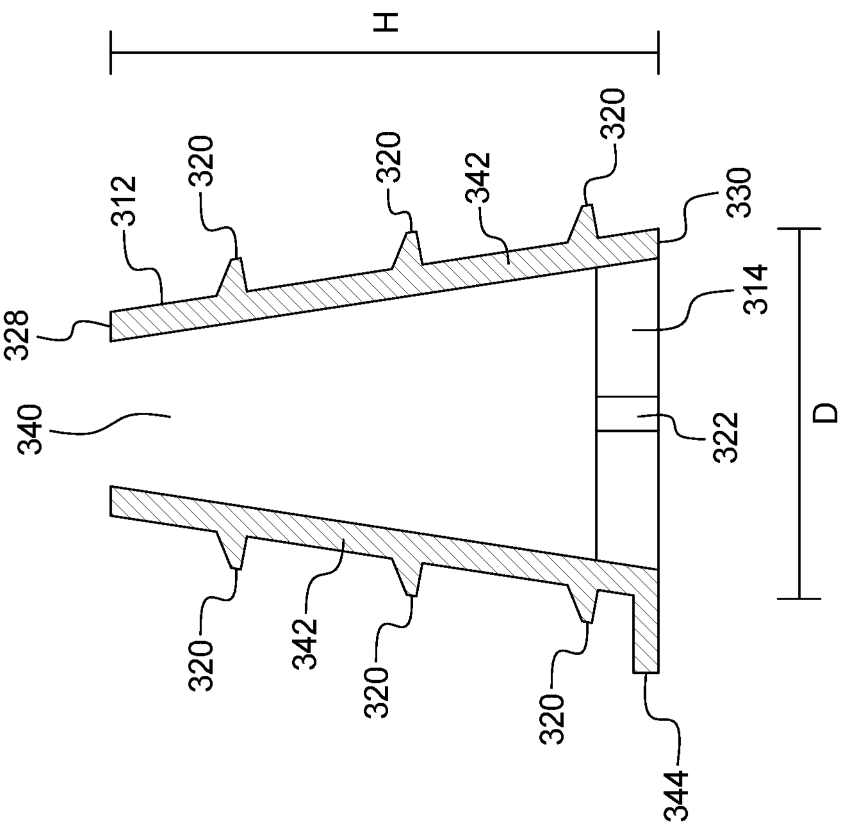
FIG. 15 shows a front cross-sectional view of the nasal device of FIG. 13.

FIGS. 13 to 15 illustrate an alternative embodiment of a nasal device 310 according to the present disclosure. In the illustrated embodiment, nasal device 310 includes a body 312 that can be placed into one of the user's nasal passages and a filter 314 that filters air breathed into the user's nasal passage. When body 312 is placed into the user's nasal passage, body 312 provides an airtight seal of the nasal passage such that all air breathed in by the user must pass through filter 314. In use, two of the nasal devices 310 are used by the user at the same time, with the user placing one nasal device 310 in each nasal passage such that the user cannot breathe in through his or her nose unless the air passes through a filter 314.

Nasal device 310 can be secured to the user's nostril in a variety of ways. In the illustrated embodiment, body 312 is cone-shaped and includes a plurality of flexible ribs 320 that conform to the inside of the user's nasal passage as nasal device 310 is inserted into the nasal passage, so as to anchor nasal device 310 within the nasal passage. In an embodiment, the ribs 320 can form a continuous spiral around body 312. In another embodiment, body 312 can be made of a flexible material such as a foam material that is capable of conforming to the inside of the user's nasal passage when inserted into the user's nostril, and then returning to an original shape when removed from the user's nostril. Suitable foam materials include, for example, plastic, urethane, polyurethane and other similar materials. Those of ordinary skill in the art will recognize other suitable materials that can be used for body 312.

Filter 314 can be formed as described above for filter 14. Like with nasal device 10, filter 314 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 314 can include copper or a copper alloy or another material as described above. Those of ordinary skill in the art will recognize other materials that can be used. In alternative embodiments, filter 314 can include or exclude one or more of a ferrous metal, a non-ferrous metal, a noble metal, a heavy metal and a metal alloy. For example, filter 314 can include or metals such as aluminum, iron, nickel, cobalt, silver and/or the like. Filter 314 can also be formed of one or more layers as described above with respect to filter 14.

In the illustrated embodiment, filter 314 is located at the base of body 312 so that any air that passes through internal cavity 340 must pass through filter 314. Locating filter 314 at the base of body 312 advantageously allows filter 314 to be a larger size than if it were located at an intermediate location or at the top of internal cavity 340, which allows more air to pass through filter 314. Those of ordinary skill in the art will recognize, however, that filter 314 can be located anywhere within internal cavity 340 and still serve its purpose to filter air breathed by the user.

Nasal device 310 can also optionally include a microvalve 322 that permits unfiltered air to be breathed out by the user. In an embodiment, microvalve 322 is a one-way valve, wherein air can be exhaled through microvalve 322, but cannot be inhaled through microvalve 322. That is, air can flow through microvalve 322 in the direction from top surface 328 towards base 330, but not in the direction from base 330 towards top surface 328. In the illustrated embodiment, microvalve 322 is located in the center of filter 314, but microvalve 322 can also be located in other locations, for example, along a sidewall 342 of body 312.

In an embodiment, body 312 can further include a tab 344 including a contamination indicator/sensor 346. In an embodiment, contamination indicator 346 includes a specialized color-changing ink which changes color in the presence of known viruses and airborne bacteria. Upon contamination of nasal device 310, contamination indicator 346 changes color to indicate that the nasal device 310 needs to be replaced, changed, and/or properly disposed. Contamination indicator 346 can also change to different colors to indicate the level of microbial contamination or pollution. In an embodiment, contamination sensor 346 can be printed or stamped onto tab 344, or can be printed or stamped on another external surface of nasal device 310. Contamination indicator 346 can also be associated with a computer-based application as described above.

As discussed above, two of the nasal devices 310 are used by the user at the same time, with the user placing one nasal device 310 in each nasal passage such that the user cannot breath in through his or her nose unless the air passes through a filter 314. The use of two nasal devices 310, as compared to one nasal device 210 described above, can be advantageous because it allows users with irregularly shaped nostrils to position the two nasal devices 310 in a preferred manner. The user could also use different sized or shaped nasal devices to cover different sized and shaped nostrils in the same nose. In an embodiment, a kit could be prepared for a user with a variety of nasal devices 310 of different shapes and sizes, and the user could determine which of the nasal devices to use. The variety of different shapes and sizes can include, for example, different heights H for each body 312, different diameters D for each body 312, different angles for cone-shaped body 312 from base 330 to top surface 328, different sizes for the plurality of ribs 320, different materials for each body 312, and/or different shapes for base 330 and/or top surface 328 of body 312. Different nasal devices 310 could also have different filter types (different shapes, sizes, materials, etc.) so that the user could use different types of filters in different settings.

Figure 17:
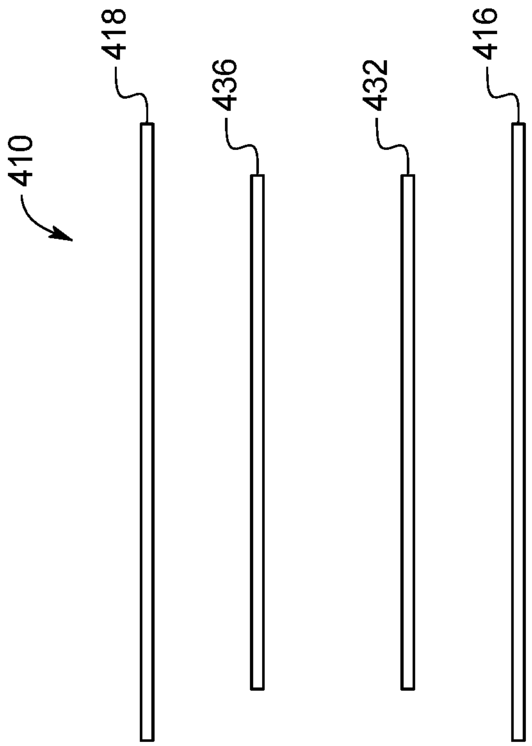
FIG. 17 shows an exploded view of the nasal device of FIG. 16.
Figure 16:
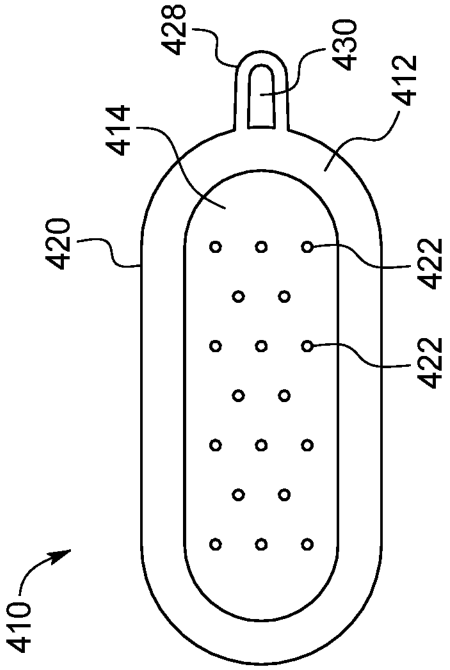
FIG. 16 shows a front elevational view of an example embodiment of a nasal device according to the present disclosure.

FIGS. 16 and 17 illustrate an alternative embodiment of a nasal device 410 according to the present disclosure. Similar to nasal device 10, nasal device 410 includes a body 412 that can be secured over a user's nasal passages and a filter 414 that filters air breathed into the user's nose.

Body 412 is a thin, flexible, preferably elastic material that can be bent or adjusted to fit a variety of differently shaped nostrils. Since air should only pass through filter 414 of nasal device 410 when the user is breathing in, body 412 must be formed of an airtight material. Suitable materials include, for example, paper, plastic such as PVC, polyethylene or polyurethane, woven or nonwoven fabrics, or latex. Those of ordinary skill in the art will recognize other suitable materials that can be used for body 412.

In the illustrated embodiment, body 412 includes an adhesive surface 416 and an outer surface 418. The adhesive surface 416 is configured adhere to the skin on the user's nostrils around the user's nasal passages to align filter 414 over the user's nasal passages. The outer surface 418 is configured to face outward from the user's skin when nasal device 410 is being used. The adhesive surface 416 can either be an adhesive applied to the outer surface 416, or a layer of material separate from the outer surface 418 that contains adhesive and is attached to the outer surface 418. In a preferred embodiment, the adhesive surface 416 is a soft foam surface with adhesive applied to the soft foam. Suitable materials for the adhesive include, for example, acrylate or vinyl resins such as methacrylates or epoxy diacrylates. Those of ordinary skill in the art will recognize other suitable materials that can be used for adhesive surface 116.

In the illustrated embodiment, the outer contour 420 of body 412 is shaped to cover both of the user's nostrils and the user's septal cartilage when placed on the user's nose. Since air breathed in by the user should only pass through filter 414, the outer contour 420 of body 412 should be sized and shaped to press against the skin on the user's nostrils around the user's nasal passages, so that air cannot be breathed in through the user's nostrils without the air passing through filter 14. Those of ordinary skill in the art will understand that other sizes and shapes can be used for body 412.

Filter 414 can be formed as described above for filter 14. Like the filters in the previous embodiments, filter 414 includes a plurality of apertures 422 and is located in a central portion of body 412 so that filter 414 is located over one or both of the user's nasal passages when body 412 is fitted to the user's nose. Like with nasal device 10, filter 414 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 414 can include copper or a copper alloy or another material as described above. Those of ordinary skill in the art will recognize other materials that can be used. In alternative embodiments, filter 414 can include or exclude one or more of a ferrous metal, a non-ferrous metal, a noble metal, a heavy metal and a metal alloy. For example, filter 414 can include metals such as aluminum, iron, nickel, cobalt, silver and/or the like. Filter 414 can also be formed of one or more layers 432, 436 as described above with respect to filter 14.

Body 412 can further include a tab 428 protruding from the outer contour 420. In the illustrated embodiment, tab 428 includes a contamination indicator/sensor 430. In an embodiment, contamination indicator 430 includes a specialized color-changing ink which changes color in the presence of known viruses and airborne bacteria. Upon contamination of nasal device 410, contamination indicator 430 changes color to indicate that the nasal device 410 to be replaced, changed, and/or properly disposed. Contamination indicator 430 can also change to different colors to indicate the level of microbial contamination or pollution. In an embodiment, contamination sensor 430 can be printed or stamped onto tab 428 or another external surface of nasal device 410. Contamination indicator 430 can also be associated with a computer-based application as described above. Tab 428 can also be used by a user to more easily remove nasal device 410 from the user's nose after use.

Figure 19:
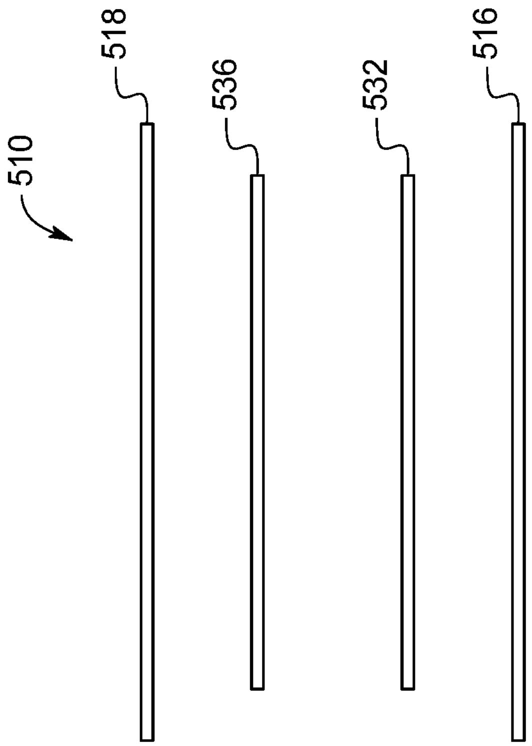
FIG. 19 shows an exploded view of the nasal device of FIG. 18.
Figure 18:
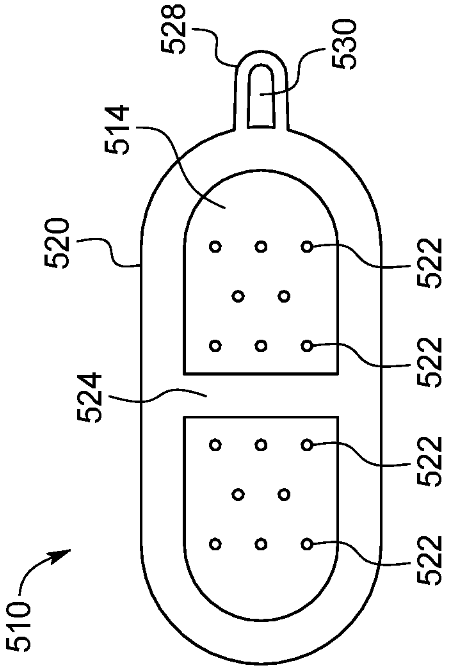
FIG. 18 shows a front elevational view of an example embodiment of a nasal device according to the present disclosure.

FIGS. 18 and 19 illustrate an alternative embodiment of a nasal device 510 according to the present disclosure. Similar to nasal device 10, nasal device 510 includes a body 512 that can be secured over a user's nasal passages and a filter 514 that filters air breathed into the user's nose.

Body 512 is a thin, flexible, preferably elastic material that can be bent or adjusted to fit a variety of differently shaped nostrils. Since air should only pass through filter 514 of nasal device 510 when the user is breathing in, body 512 must be formed of an airtight material. Suitable materials include, for example, paper, plastic such as PVC, polyethylene or polyurethane, woven or nonwoven fabrics, or latex. Those of ordinary skill in the art will recognize other suitable materials that can be used for body 512.

In the illustrated embodiment, body 512 includes an adhesive surface 516 and an outer surface 518. The adhesive surface 516 is configured adhere to the skin on the user's nostrils around the user's nasal passages to align filter 514 over the user's nasal passages. The outer surface 518 is configured to face outward from the user's skin when nasal device 510 is being used. The adhesive surface 516 can either be an adhesive applied to the outer surface 516, or a layer of material separate from the outer surface 518 that contains adhesive and is attached to the outer surface 518. In a preferred embodiment, the adhesive surface 516 is a soft foam surface with adhesive applied to the soft foam. Suitable materials for the adhesive include, for example, acrylate or vinyl resins such as methacrylates or epoxy diacrylates. Those of ordinary skill in the art will recognize other suitable materials that can be used for adhesive surface 516.

In the illustrated embodiment, the outer contour 520 of body 412 is shaped to cover both of the user's nostrils and the user's septal cartilage when placed on the user's nose. Adhesive surface 516 further includes a center portion 524 that is configured to adhere to the user's septal cartilage. Since air breathed in by the user should only pass through filter 514, the outer contour 520 of body 512 should be sized and shaped to press against the skin on the user's nostrils around the user's nasal passages, so that air cannot be breathed in through the user's nostrils without the air passing through filter 514. Those of ordinary skill in the art will understand that other sizes and shapes can be used for body 512.

Filter 514 can be formed as described above for filter 14. Like the filters in the previous embodiments, filter 514 includes a plurality of apertures 522 and is located over the user's nasal passages when body 512 is fitted to the user's nose. Like with nasal device 10, filter 514 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 514 can include copper or a copper alloy or another material as described above. Those of ordinary skill in the art will recognize other materials that can be used. In alternative embodiments, filter 514 can include or exclude one or more of a ferrous metal, a non-ferrous metal, a noble metal, a heavy metal and a metal alloy. For example, filter 514 can include metals such as aluminum, iron, nickel, cobalt, silver and/or the like. Filter 414 can also be formed of one or more layers 532, 536 as described above with respect to filter 14.

Body 512 can further include a tab 528 protruding from the outer contour 520. In the illustrated embodiment, tab 528 includes a contamination indicator/sensor 530. In an embodiment, contamination indicator 530 includes a specialized color-changing ink which changes color in the presence of known viruses and airborne bacteria. Upon contamination of nasal device 510, contamination indicator 530 changes color to indicate that the nasal device 510 to be replaced, changed, and/or properly disposed. Contamination indicator 530 can also change to different colors to indicate the level of microbial contamination or pollution. In an embodiment, contamination sensor 530 can be printed or stamped onto tab 528 or another external surface of nasal device 510. Contamination indicator 530 can also be associated with a computer-based application as described above. Tab 528 can also be used by a user to more easily remove nasal device 510 from the user's nose after use.

Figure 21:
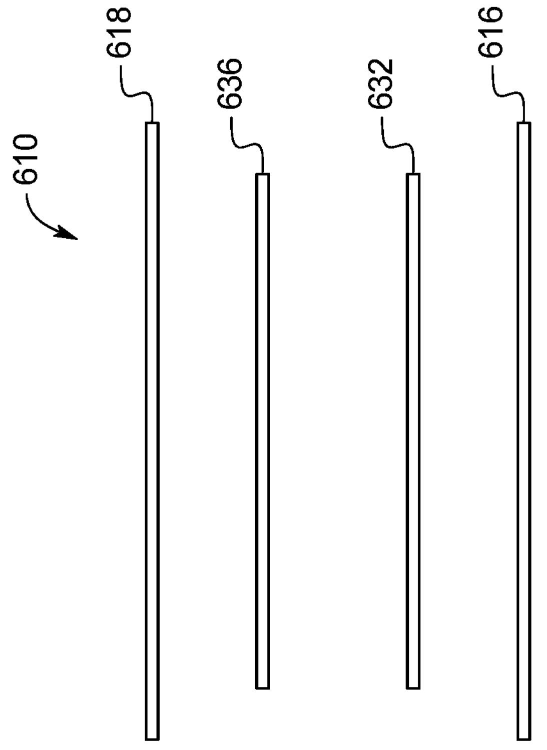
FIG. 21 shows an exploded view of the nasal device of FIG. 20.
Figure 20:
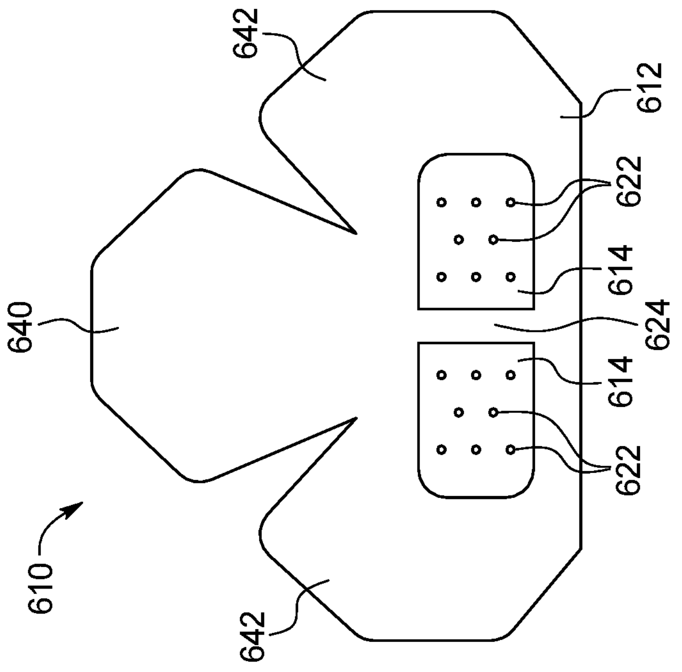
FIG. 20 shows a front elevational view of an example embodiment of a nasal device according to the present disclosure.

FIGS. 20 and 21 illustrate an alternative embodiment of a nasal device 610 according to the present disclosure. Similar to nasal device 10, nasal device 610 includes a body 612 that can be secured over a user's nasal passages and a filter 614 that filters air breathed into the user's nose.

Body 612 is a thin, flexible, preferably elastic material that can be bent or adjusted to fit a variety of differently shaped nostrils. Since air should only pass through filter 614 of nasal device 610 when the user is breathing in, body 612 must be formed of an airtight material. Suitable materials include, for example, paper, plastic such as PVC, polyethylene or polyurethane, woven or nonwoven fabrics, or latex. Those of ordinary skill in the art will recognize other suitable materials that can be used for body 612.

In the illustrated embodiment, body 612 includes an adhesive surface 616 and an outer surface 618. The adhesive surface 616 is configured adhere to the skin on the user's nostril around the user's nasal passage to align filter 614 over the user's nasal passage. The outer surface 618 is configured to face outward from the user's skin when nasal device 610 is being used. The adhesive surface 616 can either be an adhesive applied to the outer surface 616, or a layer of material separate from the outer surface 618 that contains adhesive and is attached to the outer surface 618. In a preferred embodiment, the adhesive surface 616 is a soft foam surface with adhesive applied to the soft foam. Suitable materials for the adhesive include, for example, acrylate or vinyl resins such as methacrylates or epoxy diacrylates. Those of ordinary skill in the art will recognize other suitable materials that can be used for adhesive surface 616.

In the illustrated embodiment, body 612 is shaped to cover both of the user's nostrils and the user's septal cartilage when placed on the user's nose. Body 612 includes a nose tab 640 and two nostril tabs 642. Nose tab 640 is configured to fold up over the tip of the user's nose, and the nostril tabs 642 are configured to fold up over the sides of each of the user's nostrils. Nose tab 640 and nostril tabs 642 serve to more securely adhere nasal device 610 to the user's nose, which also helps ensure that no air passes into the user's nose without passing through filter 614. Adhesive surface 616 further includes a center portion 624 that is configured to adhere to the user's septal cartilage. In a preferred embodiment, the width of body 612 from one nostril tab 642 to the other is about 7 to 8 cm, and the height of body 612 from the bottom edge in FIG. 21 to the top of nose tab 640 is about 4.5 to 6 cm. Those of ordinary skill in the art will understand that other sizes and shapes can be used for nose tab 640 and/or nostril tabs 642, and that one or more of nose tab 640 and/or nostril tabs 642 can be added to any nasal device described herein.

Like the filters in the previous embodiments, filter 614 includes a plurality of apertures 622 and is located over the user's nasal passages when body 612 is fitted to the user's nose. Like with nasal device 10, filter 614 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 614 can include copper or a copper alloy or another material as described above. Those of ordinary skill in the art will recognize other materials that can be used. In alternative embodiments, filter 614 can include or exclude one or more of a ferrous metal, a non-ferrous metal, a noble metal, a heavy metal and a metal alloy. For example, filter 614 can include metals such as aluminum, iron, nickel, cobalt, silver and/or the like. Filter 614 can also be formed of one or more layers 632, 636 as described above with respect to filter 14.

FIGS. 22 to 25 illustrate an alternative embodiment of a nasal device 710 according to the present disclosure. In the illustrated embodiment, nasal device 710 includes a body 712 that can be placed into the user's nasal passages and filters 714 that filter air breathed into the user's nose. When body 712 is placed into the user's nasal passages, substantially all air breathed in by the user must pass through filters 714.

In the illustrated embodiment, body 712 includes a first nostril plug 716 and a second nostril plug 718. In use, the first nostril plug 716 is placed into the user's left nasal passage, and the second nostril plug 718 is placed into the user's right nasal passage, or vice versa. The first and second nostril plugs 716, 718 are connected by a bridge 724 that that is located over the user's septal cartilage when nasal device 710 is being used. Bridge 724 helps hold the first and second nostril plugs 716, 718 in place when placed in the user's nasal passages.

As illustrated, body 712 has a winding shape, with two bulbous portions 732, 734 located between the respective first and second nostril plugs 716, 718 and bridge 724. The bulbous portions 732, 734 pinch the user's septal cartilage as the first and second nostril plugs 716, 718 are inserted into the user's nostrils. In an embodiment, body 712 can be formed of a bendable material that allows the user to push bulbous portions 732, 734 towards each other as first and second nostril plugs 716, 718 are inserted into the user's nostrils to cause the bulbous portions 832, 834 to pinch the septal cartilage. In another embodiment, body 712 can be formed of a resilient material that is biased towards the pinching position and automatically pushes bulbous portions 732, 734 towards each other as first and second nostril plugs 716, 718 are inserted into the user's nostrils.

Figure 26:
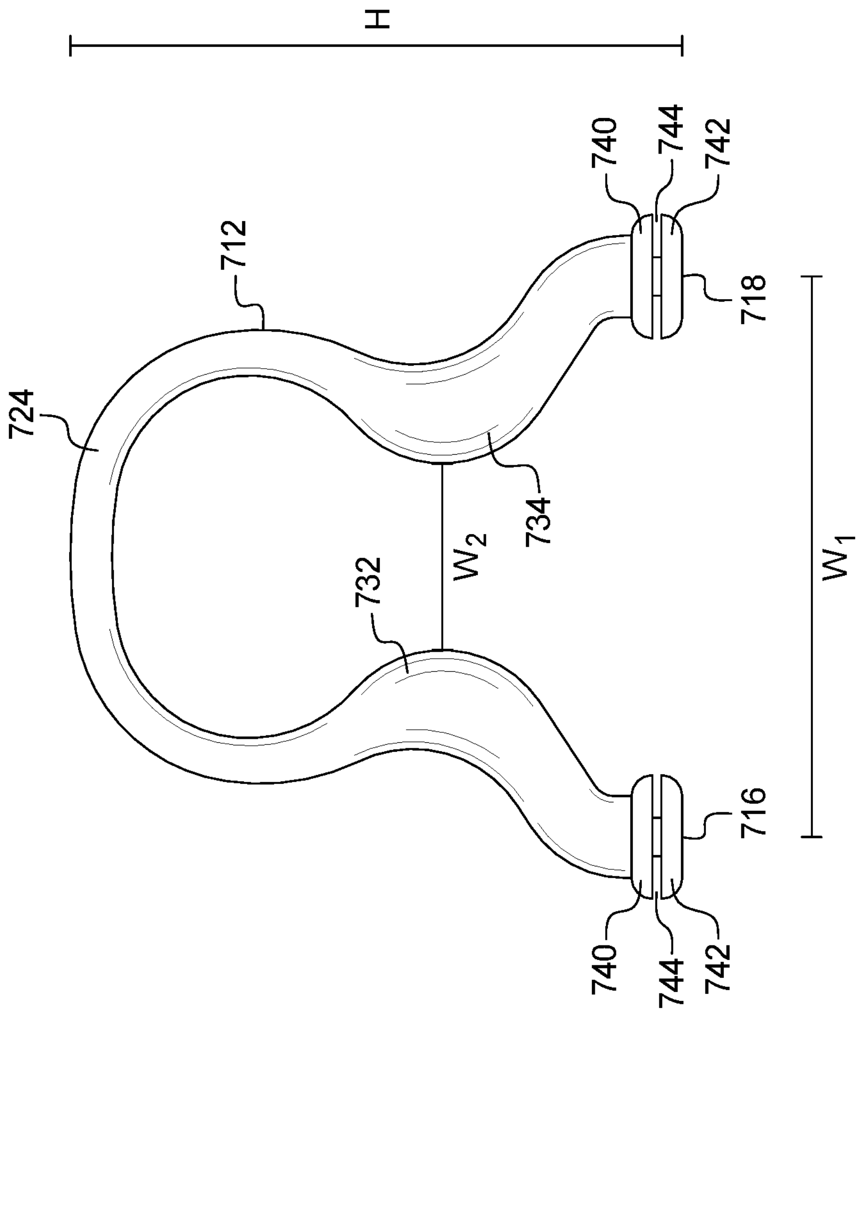
FIG. 26 shows a front elevational view of the body of the nasal device of FIG. 22.

As illustrated, nasal device 710 includes two filters 714, with one filter 714 being attached to body 712 at nostril plug 716 and the other filter 714 being attached to body 712 at nostril plug 718. As illustrated in the example embodiment of FIG. 26, each nostril plug 716, 718 can include a first portion 740, a second portion 742 and a gap 744 between the first portion and the second portion, so that a filter 714 can be inserted into the gap 744 and held in place on body 712 between first portion 740 and second portion 742. In an embodiment, the filters 714 can be made of a stretchable material and can include a central aperture that can be stretched over second portion 742 to locate the filter 714 between first portion 740 and second portion 742.

Filter 714 can be formed as described above for filter 14. Like the filters in the previous embodiments, each filter 714 includes a plurality of apertures 722 and is located over the user's nasal passages when body 712 is fitted to the user's nose. Like with nasal device 10, filter 714 can include, for example, an air-permeable, mesh or grid-like, porous structure that can be breathed through by the wearer that is configured to filter dust, small particles, pollutants, chemical agents, dangerous gases and/or microorganisms from the air breathed by the wearer. In an embodiment, filter 714 can include copper or a copper alloy or another material as described above. Those of ordinary skill in the art will recognize other materials that can be used. In alternative embodiments, filter 714 can include or exclude one or more of a ferrous metal, a non-ferrous metal, a noble metal, a heavy metal and a metal alloy. For example, filter 714 can include metals such as aluminum, iron, nickel, cobalt, silver and/or the like. Filter 714 can also be formed of one or more layers as described above with respect to filter 14.

Figure 22:
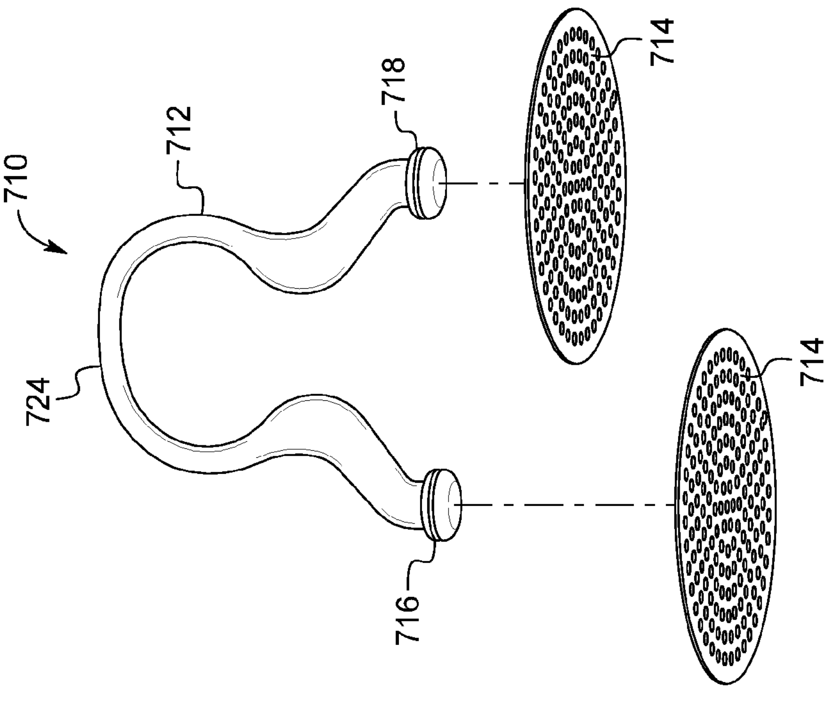
FIG. 22 shows an exploded perspective view of an example embodiment of a nasal device according to the present disclosure.
Figure 23:
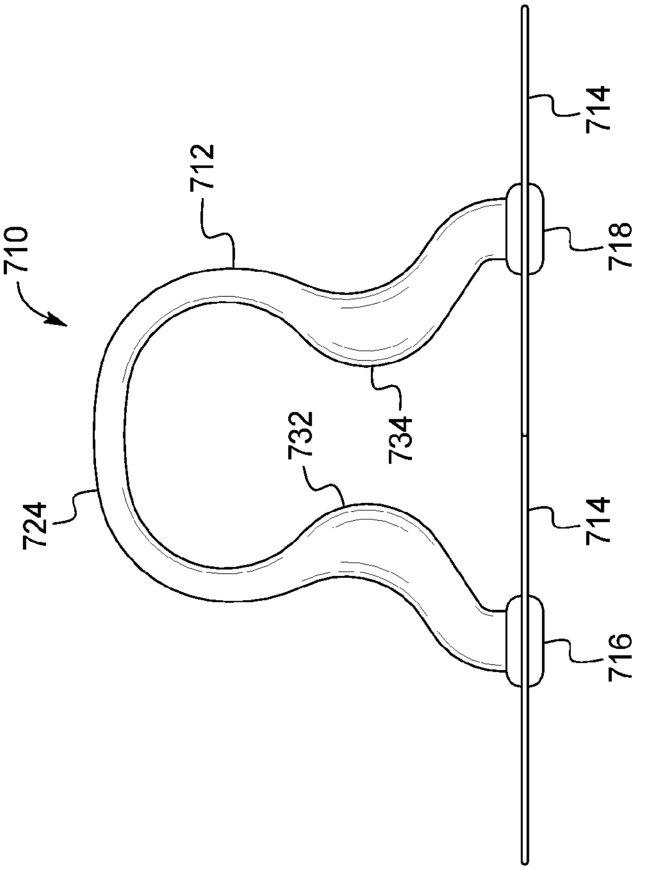
FIG. 23 shows a front elevational view of the nasal device of FIG. 22.
Figure 25:
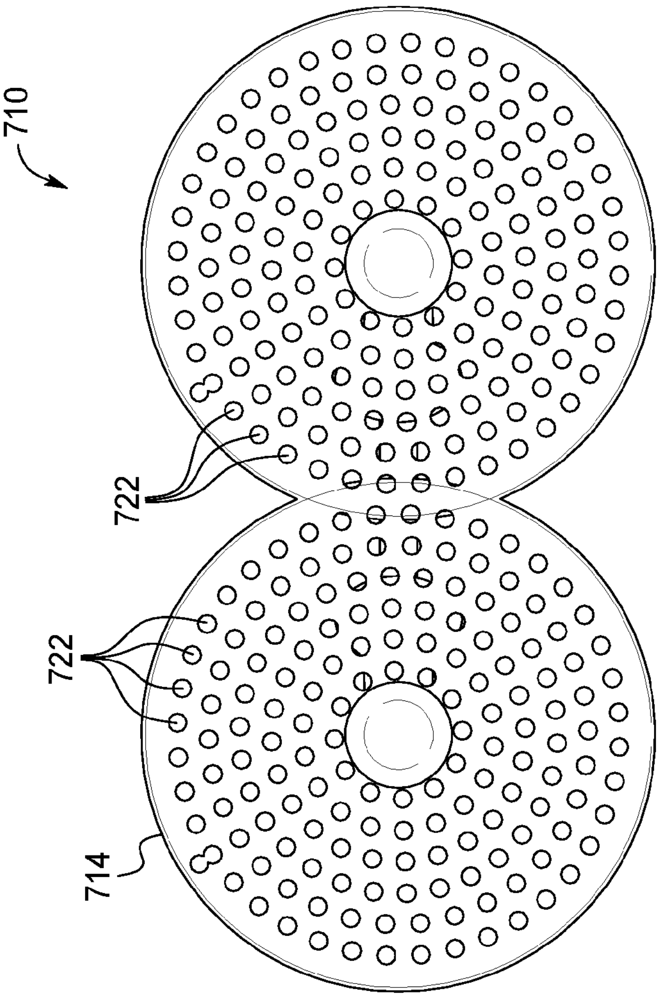
FIG. 25 shows a bottom plan view of the nasal device of FIG. 22.
Figure 24:
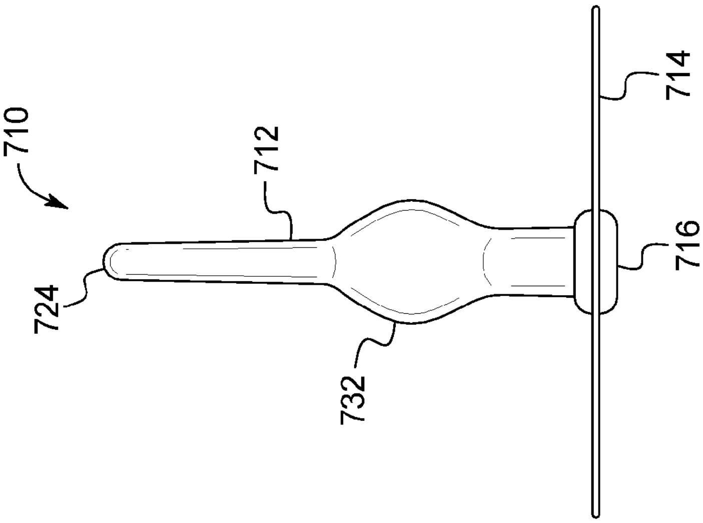
FIG. 24 shows a side elevational view of the nasal device of FIG. 22.

As illustrated in FIGS. 22 and 25, the filter 714 of nostril plug 716 overlaps with the filter 714 of nostril plug 718. In the illustrated embodiment, the filters 714 are bendable, so they conform to the user's nasal passages as the nostril plugs 716, 718 are inserted into the nasal passages. The filters 714 are also sized to be larger than the user's nasal passages, so that they each bend within the nasal passage to form a cone shape that contacts the sides of each nasal passage and causes substantially all air breathed in by the user to pass therethrough. In alternative embodiments, filter 714 can be formed of different shapes or sizes or formed so as not to overlap.

As set forth above, body 712 is shaped with a round bridge 724, which is connected to inwardly converging bulbous portions 732, 734, which are then each connected to an outwardly converging portion including a nostril plug 716, 718. In the illustrated embodiment, body 712 has a height H of about 14.6 mm, a width W1 of about 13.5 mm between nostril plug 716 and nostril plug 718, and a width W2 of about 4.5 mm between bulbous portion 732 and bulbous portion 743. In the illustrated embodiment, each filter 714 has a diameter of about 14.7 mm and a thickness of about 0.2 mm. Those of ordinary skill in the art will recognize that other dimensions can be used.

In an embodiment, nasal device 710 can include an optional microvalve that permits unfiltered air to be breathed out by the user. The microvalve can be formed as described above. In another embodiment, nasal device 710 can include a contamination indicator/sensor as described above, which can for example include a specialized color-changing ink which changes color in the presence of known viruses and airborne bacteria. In an embodiment, the contamination indicator can be printed or stamped onto bridge 724 or another portion of nasal device 710.

Figure 28:
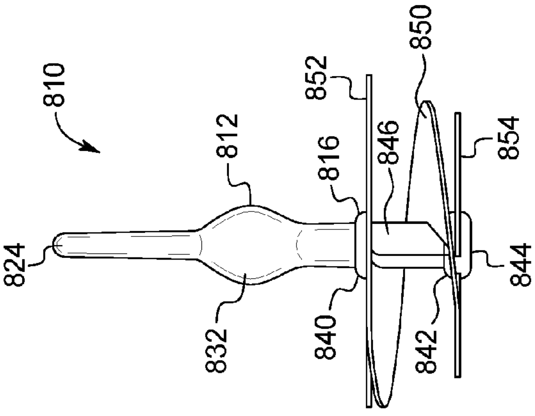
FIG. 28 shows a side elevational view of the nasal device of FIG. 27.
Figure 29:
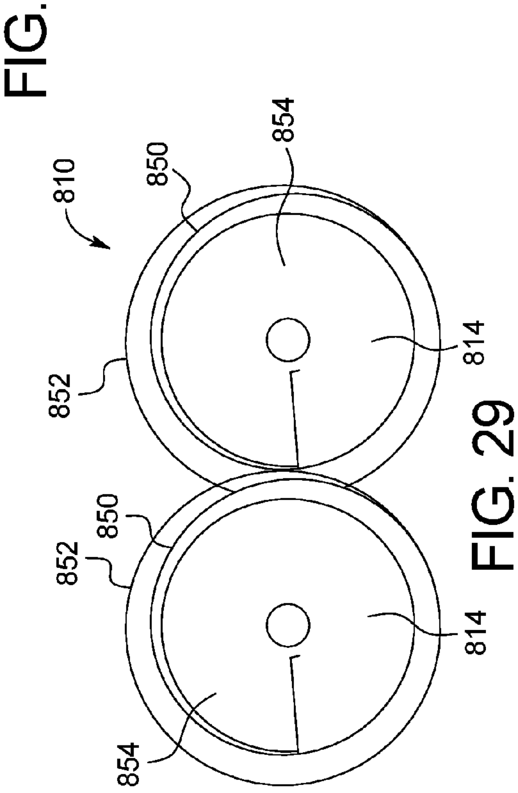
FIG. 29 shows a bottom plan view of the nasal device of FIG. 27.
Figure 27:
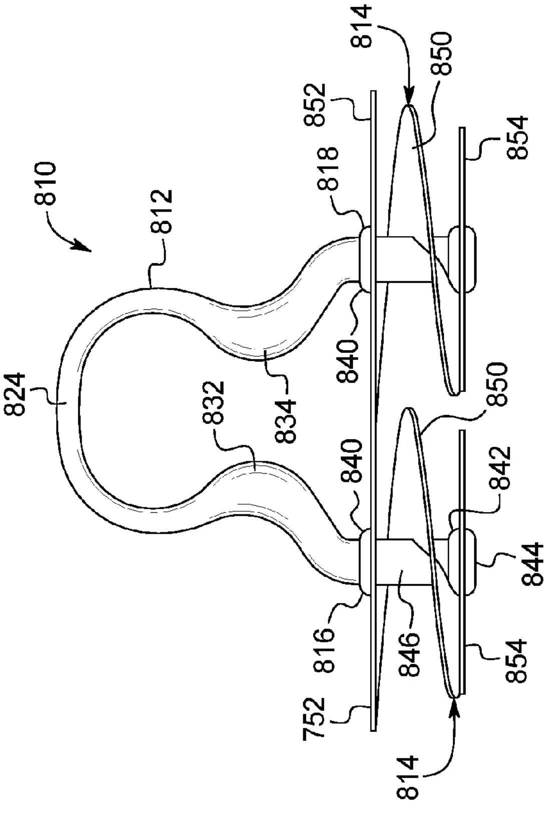
FIG. 27 shows a front elevational view of an example embodiment of a nasal device according to the present disclosure.

FIGS. 27 to 29 illustrate an alternative embodiment of a nasal device 810 according to the present disclosure. In the illustrated embodiment, nasal device 810 includes a body 812 that can be placed into the user's nasal passages and filters 814 that filter air breathed into the user's nose. When body 812 is placed into the user's nasal passages, substantially all air breathed in by the user must pass through filters 814.

In the illustrated embodiment, body 812 includes a first nostril plug 816 and a second nostril plug 818. In use, the first nostril plug 816 is placed into the user's left nasal passage, and the second nostril plug 818 is placed into the user's right nasal passage, or vice versa. The first and second nostril plugs 816, 818 are connected by a bridge 824 that that is located over the user's septal cartilage when nasal device 810 is being used. Bridge 824 helps hold the first and second nostril plugs 816, 818 in place when placed in the user's nasal passages.

As illustrated, body 812 has a winding shape, with two bulbous portions 832, 834 located between the respective first and second nostril plugs 816, 818 and bridge 824. The bulbous portions 832, 834 pinch the user's septal cartilage as the first and second nostril plugs 816, 818 are inserted into the user's nostrils. In an embodiment, body 812 can be formed of a bendable material that allows the user to push the bulbous portions 832, 834 towards each other as first and second nostril plugs 816, 818 are inserted into the user's nostrils to cause the bulbous portions 832, 834 to pinch the septal cartilage. In another embodiment, body 812 can be formed of a resilient material that is biased towards the pinching position and automatically pushes bulbous portions 832, 834 towards each other as first and second nostril plugs 816, 818 are inserted into the user's nostrils.

As illustrated, nasal device 810 includes two filters 814, with one filter being attached to body 812 at nostril plug 816 and the other filter being attached to body 812 at nostril plug 818. In the illustrated embodiment, each filter 814 has a spiral shape in which a middle portion 850 spirals around a nostril plug 816, 818 from its top portion 852 to its bottom portion 854.

As illustrated, each nostril plug 816, 818 can include a first portion 840, a second portion 842 and a third portion 844, with a rod 846 connecting the first portion 840 to the second portion 842, the rod 846 having a smaller diameter than first portion 840 and second portion 842. Filter 814 can then be aligned on a nostril plug 816, 818 by securing bottom portion 854 of filter 814 within a gap between second portion 842 and third portion 844 as described above with respect to gap 744, while top portion 852 of filter 814 can be placed against or attached to first portion 840, so that middle portion 850 of filter 814 spirals around rod 846 continuously from top portion 852 to bottom portion 854.

Filter 814 can be formed as described above for filter 14. Like the filters in the previous embodiments, each filter 814 includes a plurality of apertures and is located over the user's nasal passages when body 812 is fitted to the user's nose. Like with nasal device 10, filter 814 can include, for example, an air-permeable, mesh or grid-like, porous structure that can be breathed through by the wearer and that is configured to filter dust, small particles, pollutants, chemical agents, dangerous gases and/or microorganisms from the air breathed by the wearer. In an embodiment, filter 814 can include copper or a copper alloy or another material as described above. Those of ordinary skill in the art will recognize other materials that can be used. In alternative embodiments, filter 814 can include or exclude one or more of a ferrous metal, a non-ferrous metal, a noble metal, a heavy metal and a metal alloy. For example, filter 814 can include metals such as aluminum, iron, nickel, cobalt, silver and/or the like. Filter 814 can also be formed of one or more layers as described above with respect to filter 14.

As illustrated in FIG. 29, the filter 814 of nostril plug 816 overlaps with the filter 814 of nostril plug 718. In the illustrated embodiment, the filters 814 are bendable, so they conform to the user's nasal passages as the nostril plugs 816, 718 are inserted into the nasal passages. The filters 814 are also sized to be larger than the user's nasal passages, so that they bend within the nasal passages to seal the outer edges of the nasal passages and cause substantially all air breathed in by the user to pass therethrough. In alternative embodiments, filter 814 can be formed of different shapes or sizes or formed so as not to overlap.

As set forth above, body 812 is shaped with a round bridge 824, which is connected to inwardly converging bulbous portions 832, 834, which are then each connected to an outwardly converging portion including a nostril plug 816, 818. The dimensions of body 812 can be similar to the dimensions of body 712 described above. In an embodiment, the diameter of the top portion 852 of each filter 814 can be about 15 mm, while the diameter of the bottom portion 854 of each filter 814 can be about 10 mm to 12 mm, with the middle portion 850 decreasing in diameter from the top portion 852 to the bottom portion 854. By forming the bottom portion 854 to be smaller than the top portion 852, filter 814 can form a cone shape configured to be easily insertable into a user's nostrils. Those of ordinary skill in the art will recognize that other dimensions can be used.

In an embodiment, nasal device 810 can include an optional microvalve that permits unfiltered air to be breathed out by the user. The microvalve can be formed as described above. In another embodiment, nasal device 810 can include a contamination indicator/sensor as described above, which can for example include a specialized color-changing ink which changes color in the presence of known viruses and airborne bacteria. In an embodiment, the contamination indicator can be printed or stamped onto bridge 724 or another portion of nasal device 810.

Figure 30:
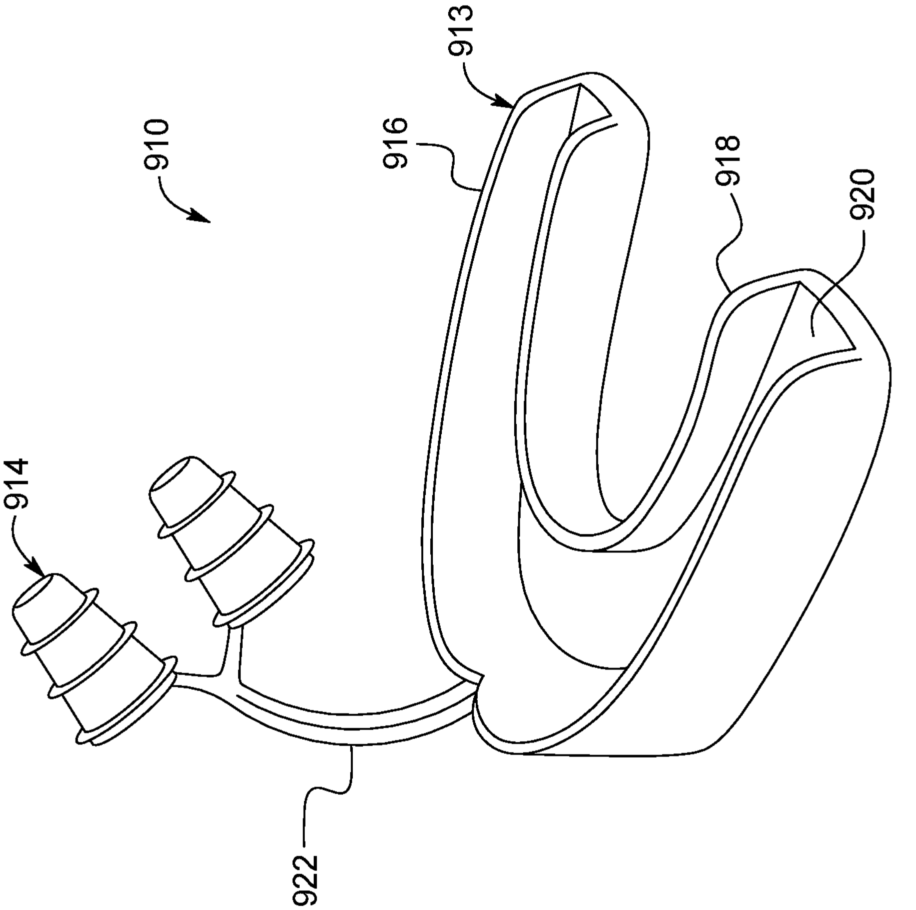
FIG. 30 shows a front perspective view of an example embodiment of a nasal device according to the present disclosure.

FIG. 30 illustrates an alternative embodiment of a nasal device 910 according to the present disclosure. In the illustrated embodiment, nasal device 910 includes an upper body 912 that can be placed into the user's nasal passages, and a lower body 913 that can be placed in the user's mouth. In the illustrated embodiment, upper body 912 is the same as body 912 discussed above, with a filter located in an internal passage therein so as to filter any air breathed in by the user.

Lower body 913 can be placed in the user's mouth to help secure upper body 912 in place in the user's nasal passages. In the illustrated embodiment, lower body 913 includes an outer wall 916, an inner wall 918, and a biting surface 920. In use, a user bites down on biting surface 920 to hold lower body 913 within the user's mouth, which not only holds nasal device 910 in place on the user's face due to the bridge 922 that holds upper body 912 and lower body 913 together, but also ensures that the user keeps his or her mouth closed and only breathes through the filter in upper body 912. Lower body 913 is preferably formed of a soft material that will not damage the user's teeth when the user bites into lower body 713. Soft materials for lower body 913 can include, for example, any suitable material for a mouth guard such as plastic, urethane, polyurethane and other similar materials. Those of ordinary skill in the art will recognize other suitable materials that can be used for lower body 913.

Although the lower surface of lower body 913 is not shown, the lower surface can be formed similar to the upper surface, with a biting surface for the user to bite into with the user's bottom teeth. The lower biting surface can also be surrounded by an outer wall and inner wall as described above. In an embodiment, the lower surface of lower body 913 is the mirror image of the upper surface shown in FIG. 30.

In an alternative embodiment, lower body 913 can include a filter in outer wall 916 so that the user can breathe through his or her mouth as well as his or her nose. In an embodiment, lower body 913 includes an accordion-like filter that unfolds when the user opens his or her mouth, so that the user can breathe through the accordion-like filter when the user breathes through his or her mouth. When the user's mouth is closed, the accordion-like filter is compressed and the user breathes through his or her nose.

Figure 31:
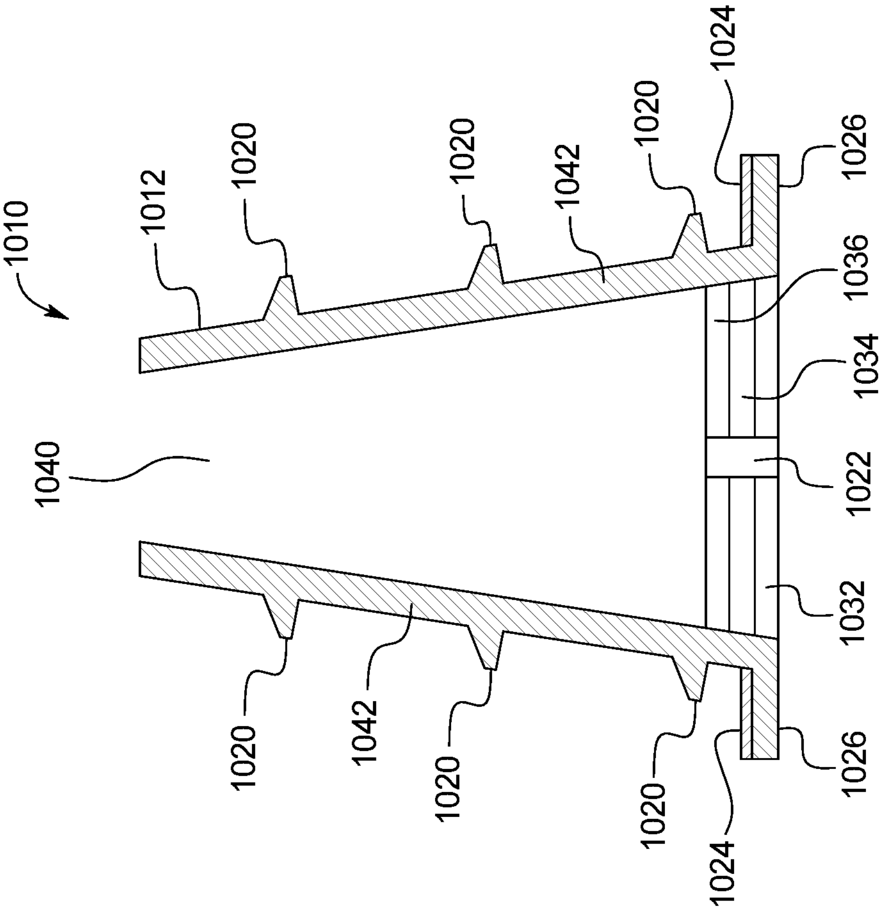
FIG. 31 shows a front cross-sectional view of an example embodiment of a nasal device according to the present disclosure.

It should be understood that any and all of the features of nasal devices 10, 110, 210, 310, 410, 510, 610, 710, 810 and 910 can be combined. FIG. 31 illustrates an example embodiment of a nasal device 1010 according to the present disclosure. Nasal device 1010 incorporates elements from each of nasal devices 10, 110, 210, 310, 410, 510, 610, 710, 810 and 910. Specifically, nasal device 1010 includes a cone-shaped body 1012 with a plurality of ribs 1020 along the sidewall 1042, and also includes an adhesive 1024 on lower lip 1026 of body 1012 that is configured to adhere to the skin on the user's nostrils around the user's nasal passages. Nasal device 1010 therefore includes multiple mechanisms for securing nasal device 1010 within a user's nostrils in an airtight manner so that all of the air breathed by the user through internal passage 1040 must pass through the first electrode 1032, insulator mesh 1034 and second electrode 1036, except that air breathed out by the user can pass through one-way microvalve 1022.

Modifications in addition to those described above may be made to the structures and techniques described herein without departing from the spirit and scope of the disclosure. Accordingly, although specific embodiments have been described, these are examples only and are not limiting on the scope of the disclosure.

What is claimed is:

1. A nasal device comprising:

a body configured to pinch a user's septal cartilage;

a first filter positioned so as to be located within one of the user's nasal passages when the body pinches the user's septal cartilage; and a second filter positioned so as to be located within the other of the user's nasal passages when the body pinches the user's septal cartilage, said first and said second filters each have a thickness, and said thickness is in the range of 0.1-1 mm;

said first and said second filters include a material selected from the group consisting of copper or a copper alloy, a ferrous metal, a non-ferrous metal, a noble metal, a heavy metal, and a metal alloy;

a contamination indicator configured to indicate when the first or second filter has been contaminated; said contamination indicator includes an indication for contamination by known viruses or airborne bacteria;

wherein the first and second filters filter air breathed into the user's nasal passages when the body pinches the user's septal cartilage.

2. The nasal device of claim 1, where the body is U-shaped, with a round bridge that is connected to inwardly converging bulbous portions, which are then connected to outwardly bending portions ending in a nostril plug.

3. The nasal device of claim 1, wherein the first and second filters are located on opposite nostril plugs.

4. The nasal device of claim 1, wherein the body has a height, and the height is in the range of 13.5 to 15.5 mm.

5. The nasal device of claim 1, wherein the body has a width, and the width is in the range of 13 to 15 mm.

6. The nasal device of claim 1, wherein the first and second filters have a diameter, and the diameter is in the range of 14 to 15.5 mm.

7. The nasal device of claim 1, wherein the first filter overlaps the second filter before the body pinches the user's septal cartilage.

8. The nasal device of claim 1, wherein the body includes a bridge with bulbous portions on opposite sides of said bridge, the bulbous portions configured to pinch the user's septal cartilage.

9. The nasal device of claim 1, wherein the first and second filters are spiral shaped, formed by the first and second filters having a top portion, a bottom portion, and a middle portion which spirals around the body from the top portion to the bottom portion.

10. The nasal device of claim 1, wherein the first and second filters are bendable so as to conform to the inside of a user's nasal passages.

11. The nasal device of claim 1, wherein the first and second filters include copper or a copper alloy.

12. The nasal device of claim 1, wherein the first and second filters are a porous, grid-like material configured to filter material selected from the group consisting of dust, small particles, pollutants, chemical agents, dangerous gases and/or microorganisms from the air breathed by the wearer.

13. The nasal device of claim 1, wherein the first and second filter are configured to filter coronavirus particles from the air breathed by the user.

14. The nasal device of claim 1, wherein the contamination indicator is printed or stamped onto a bridge or onto another portion of the nasal device.

* * * * *